US011889828B2

(12) United States Patent
Banfield

(10) Patent No.: US 11,889,828 B2
(45) Date of Patent: Feb. 6, 2024

(54) HUNTING BLIND

(71) Applicant: Jeremiah Banfield, Broken Arrow, OK (US)

(72) Inventor: Jeremiah Banfield, Broken Arrow, OK (US)

( * ) Notice: Subject to any disclaimer, the term of this patent is extended or adjusted under 35 U.S.C. 154(b) by 226 days.

(21) Appl. No.: 17/223,483

(22) Filed: Apr. 6, 2021

(65) Prior Publication Data

US 2021/0307314 A1 Oct. 7, 2021

Related U.S. Application Data

(60) Provisional application No. 63/005,742, filed on Apr. 6, 2020.

(51) Int. Cl.
*A01M 31/02* (2006.01)
*E04H 15/54* (2006.01)
(Continued)

(52) U.S. Cl.
CPC ......... *A01M 31/025* (2013.01); *E04H 15/001* (2013.01); *E04H 15/50* (2013.01); *E04H 15/54* (2013.01)

(58) Field of Classification Search
CPC ..... E04H 15/001; E04H 15/50; A01M 31/025
See application file for complete search history.

(56) References Cited

U.S. PATENT DOCUMENTS 2,159,273 A * 5/1939 Killinger ............... E04H 15/001
D25/16

2,577,983 A * 12/1951 Van Vessem ....... A01M 31/025
114/15
(Continued)

FOREIGN PATENT DOCUMENTS

CA 2496337 9/2005
CA 2475232 7/2007
(Continued)

OTHER PUBLICATIONS

Macks Prairie Wings, Dakota Decoys X Series 10 Foot Field Blind, https://www.mackspw.com/Dakota-Decoys-X-Series-10-Foot-Field-Blind (pulication date unknown).
(Continued)

*Primary Examiner* — David R Dunn
*Assistant Examiner* — Danielle Jackson
(74) *Attorney, Agent, or Firm* — Margaret S. Millikin

(57) ABSTRACT

A method and apparatus for hunting that enables hunters to remain concealed while still maneuvering with the blind constructed in an in-use configuration and without disturbing quarry. The hunting blind comprises a portable, collapsible, lightweight, pop-up frame enabling the gamesmen to gain closer proximity to small and large game while permitting movement during use without detection. When not in use, the frame of the hunting blind collapses into a compact, transportable configuration that slides into a carrying bag for easy transport. The hunting blind of the present invention offers 360 degrees of concealment, comfortably concealing two hunters. The blind comprises a cover adapted to swathe the frame and create a taut surface against which camouflage may be installed for concealment in a plurality of horizontal rows providing mechanisms for staggering the placement of camouflage on the cover to further enhance concealment.

65 Claims, 14 Drawing Sheets

(51) Int. Cl.
 E04H 15/00 (2006.01)
 E04H 15/50 (2006.01)

(56) References Cited

U.S. PATENT DOCUMENTS

| | | | |
|---|---|---|---|
| 3,744,842 A * | 7/1973 | Ronning | A01M 31/025 297/180.12 |
| 4,794,717 A | 1/1989 | Horsmann | |
| 4,798,019 A | 1/1989 | Sury et al. | |
| 4,926,893 A * | 5/1990 | Klopfenstein | E04H 15/001 135/901 |
| 5,010,909 A * | 4/1991 | Cleveland | E04H 15/001 135/901 |
| 5,377,711 A * | 1/1995 | Mueller | E04H 15/001 135/901 |
| 5,414,950 A * | 5/1995 | Johnson, Sr. | E04H 15/001 135/901 |
| 5,615,633 A * | 4/1997 | Cripe | B63B 15/00 114/361 |
| 6,382,224 B1 * | 5/2002 | Carter | E04H 15/50 135/144 |
| 6,698,131 B2 | 3/2004 | Latschaw | |
| 7,182,091 B2 | 2/2007 | Maddox | |
| 7,225,823 B1 | 6/2007 | Ransom et al. | |
| 7,237,283 B2 | 7/2007 | Devries | |
| 7,299,813 B2 * | 11/2007 | Ochi | E04H 15/50 135/159 |
| 7,395,830 B2 | 6/2008 | Seo | |
| 7,428,908 B2 | 9/2008 | Seo | |
| 7,549,434 B2 | 6/2009 | Bean | |
| 7,650,899 B2 | 1/2010 | Eastman, II et al. | |
| 7,789,099 B2 | 9/2010 | Mallookis et al. | |
| 8,381,750 B2 * | 2/2013 | Desouches | E04H 15/001 135/901 |
| 8,695,859 B1 | 4/2014 | Stalker et al. | |
| 8,701,691 B2 * | 4/2014 | Hawk, III | A01M 31/025 135/901 |
| 8,746,267 B2 | 6/2014 | Lovely, II et al. | |
| 8,826,927 B1 | 9/2014 | Beam et al. | |
| 9,033,021 B2 * | 5/2015 | Hand | A01M 31/00 135/901 |
| 9,072,290 B1 * | 7/2015 | McCauley | A01M 31/025 |
| 9,103,138 B2 | 8/2015 | Lovley, II | |
| 9,273,484 B2 * | 3/2016 | Rowley | E04H 15/001 |
| 9,279,268 B2 | 3/2016 | Liu | |
| 9,556,638 B2 | 1/2017 | Clendaniel et al. | |
| 9,683,387 B2 | 6/2017 | Lovely, II | |
| 9,717,233 B1 * | 8/2017 | McCauley | A47C 17/70 |
| 9,828,788 B2 | 11/2017 | Zhou | |
| 10,563,423 B1 * | 2/2020 | Bird | E04H 15/44 |
| 10,662,667 B2 * | 5/2020 | Stehly | E04H 15/58 |
| 10,801,232 B2 | 10/2020 | Carter | |
| 11,220,835 B2 * | 1/2022 | Tomchak | E04H 15/50 |
| 11,299,907 B1 * | 4/2022 | Hudrlik | E04H 15/50 |
| 11,547,110 B2 * | 1/2023 | Wood | E04H 15/34 |
| 2005/0178420 A1 | 8/2005 | Reis | |
| 2007/0193612 A1 * | 8/2007 | Slaughter | E04H 15/001 135/117 |
| 2010/0229906 A1 * | 9/2010 | Putman | A01M 31/025 135/96 |
| 2010/0269876 A1 | 10/2010 | Schipf | |
| 2016/0244990 A1 | 8/2016 | Clendaniel et al. | |
| 2016/0295851 A1 | 10/2016 | Peterson | |
| 2017/0241158 A1 | 8/2017 | Dresch et al. | |
| 2017/0347643 A1 * | 12/2017 | Sheedfar | E04H 15/001 |
| 2020/0375174 A1 | 12/2020 | Seaton et al. | |
| 2021/0298287 A1 * | 9/2021 | Wood | B63B 17/02 |
| 2022/0162877 A1 * | 5/2022 | Wood | A01M 31/025 |

FOREIGN PATENT DOCUMENTS

| | | |
|---|---|---|
| CN | 201424851 Y * | 3/2010 |
| CN | 202706662 | 1/2013 |
| CN | 203022417 | 6/2013 |
| CN | 204782245 | 11/2015 |
| CN | 20595537 | 2/2017 |
| CN | 206616932 | 11/2017 |
| CN | 111502395 | 8/2020 |
| DE | 202015101958 | 6/2015 |
| DE | 212019000096 | 3/2020 |
| EP | 3377716 | 5/2017 |
| GB | 171273 A * | 11/1921 |
| GB | 2577035 | 3/2020 |
| JP | 5002570 | 8/2012 |
| JP | 6469997 | 2/2019 |
| KR | 101021900 | 6/2006 |
| RU | 179257 | 7/2017 |

OTHER PUBLICATIONS

Marsh Madness Outdoors, Altan Waterfowl Blind Review, Marsh Madness Outdoors, https://www.youtube.com/watch?v=4vOvsfXSJRo (Jul. 29, 2018).

Canadian Waterfowl Supplies, Avian-X A Frame Blind, https://www.canadianwaterfowlsupplies.com/collections/layout-blinds/products/avian-x-a-frame-blind (publcation unknown).

Avian-X, A-Frame Blind, https://www.avian-x.com/shop/blinds-accessories/a-frame-blind (publication unknown).

Youtube, Altan Ultimate Waterfowl A-Frame Blind W/ Snow Cover—Full Review, Setup, and Takedown, https://www.youtube.com/watch?v=hl3_GIFPr94 (May 20, 2020).

Optics Planet, Altan Ultimate Waterfowl Blind B-WAT-100A Color: Camo, Fabric/Material: 600D Polyester, 12% off w/ Free S&H, https://www.opticsplanet.com/altan-ultimate-waterfowl-blind.html (publication unknown).

* cited by examiner

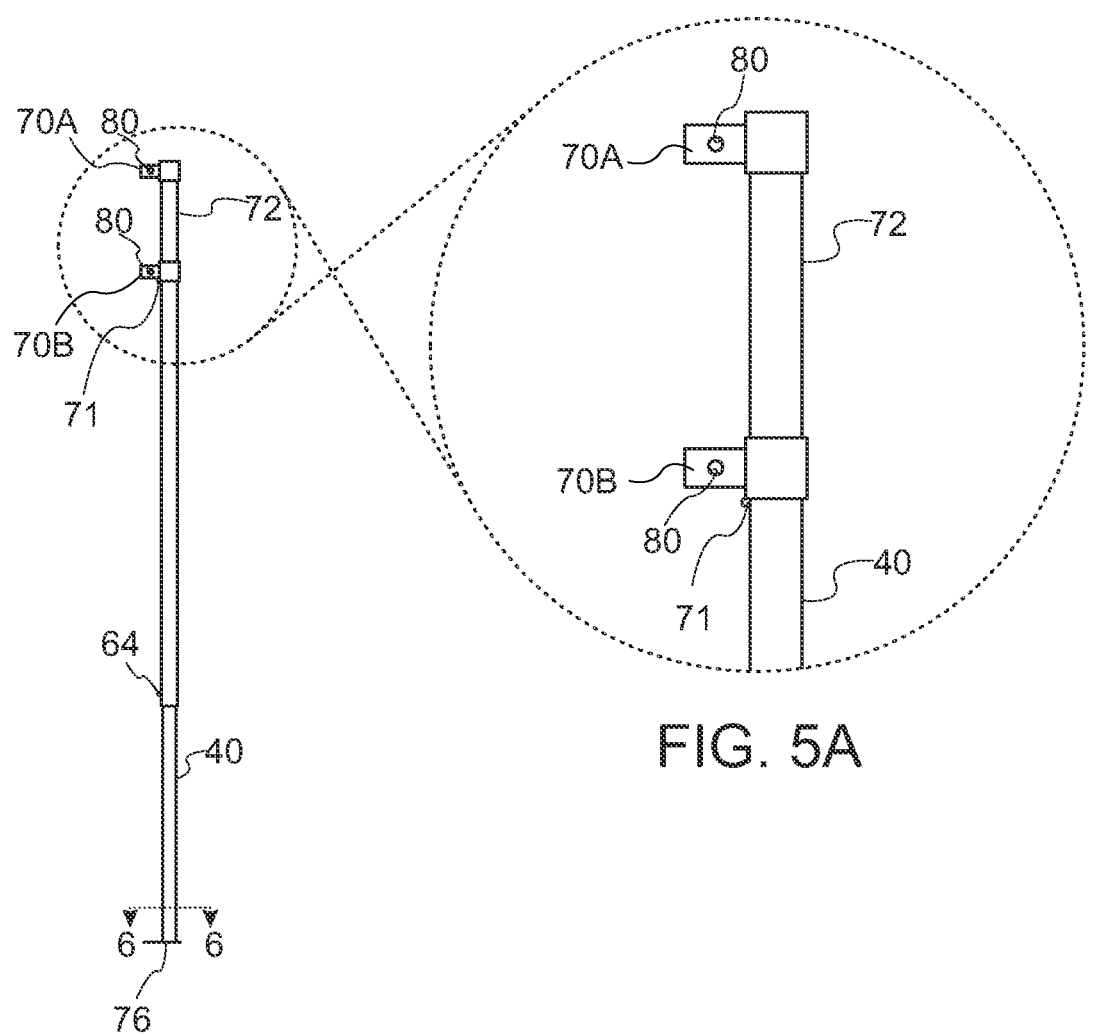
FIG. 5A
FIG. 5
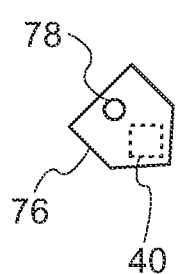
FIG. 6

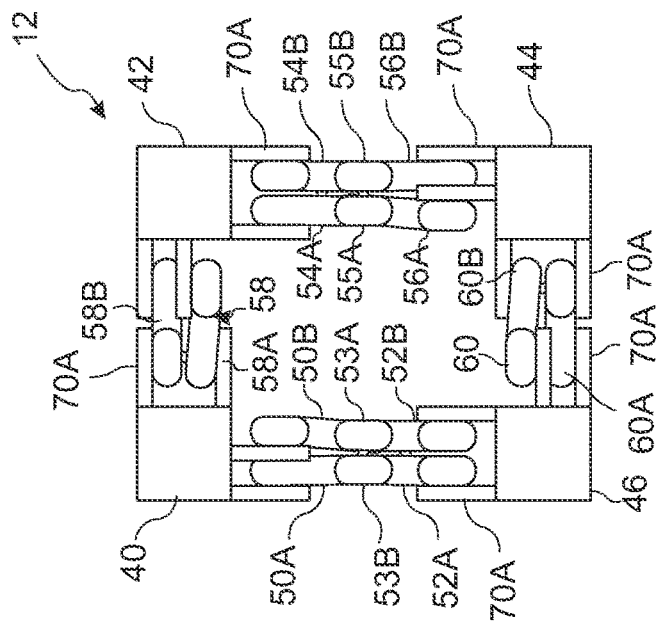
FIG. 11
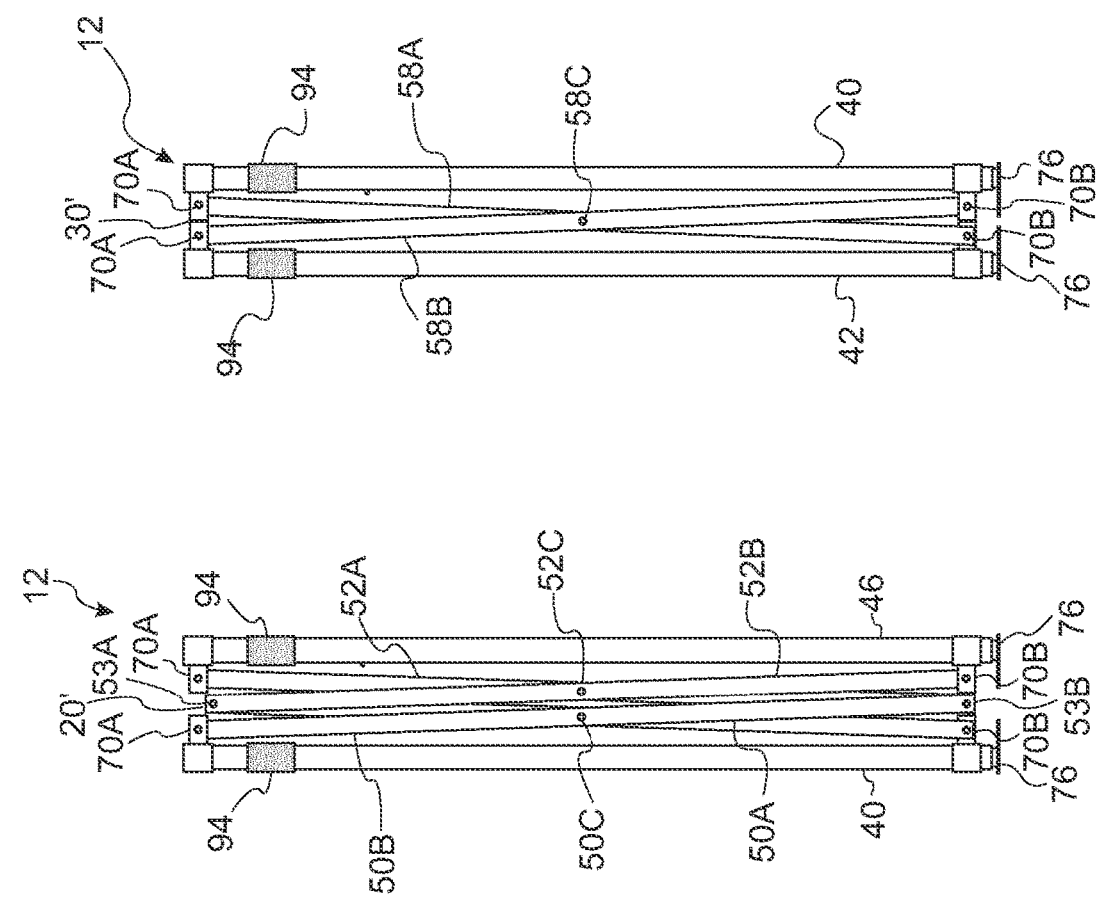
FIG. 10
FIG. 9

HUNTING BLIND

TECHNICAL FIELD OF THE INVENTION

The present invention relates generally to hunting blinds, and more particularly, but not by way of limitation, to portable ground blinds for hunting waterfowl. Methods of hunting waterfowl also are provided.

SUMMARY OF THE INVENTION

The present invention is directed to a portable hunting blind comprising: a collapsible frame; wherein: the frame defines an open position and a closed position and, when in the open position, the frame forms a trapezoidal prism having two opposing sides, each having a width, and two opposing ends, each having a width, wherein the width of the two opposing sides is greater than the width of the two opposing ends, and wherein the two opposing sides and the two opposing ends form four corners; and the frame comprises: four legs, wherein one of each of the four legs is positioned at one of the four corners formed by the opposing ends and the opposing sides; at least one end truss positioned between each of the two opposing sides, wherein: the at least one end truss comprises first and second pivot members of substantially equal length which are operatively connected about a pivot point; and the first and second pivot members of the at least one end truss positioned between each of the two opposing sides each form an aperture therein for operatively connecting the first and second pivot members about the pivot point; the aperture formed in each of the first and second pivot members of the at least one end truss positioned between each of the two opposing sides is positioned off-center along the respective lengths of each of the first and second pivot members; at least one side truss positioned between each of the two opposing ends; the frame, when in the open position, forms a trapezoidal prism and, when in the closed position, defines a compact configuration wherein in all four legs are parallel; and a cover comprising: a unit of material that swathes the frame, wherein when the hunting blind is assembled for in-use configuration, the unit of material defines a wall of the hunting blind; a plurality of receptacles for receiving camouflage, the plurality of receptacles configured on the wall of the hunting blind in a plurality of horizontal rows, wherein the placement of each of the plurality of receptacles in each of the plurality of horizontal rows is staggered with respect to the placement of the plurality of receptacles in the immediately adjacent row or rows.

The present invention further is directed to a method of hunting waterfowl, the method comprising the steps of: providing a cover and a collapsible frame; swathing the frame with the cover to provide a taut surface; providing on the cover a plurality of receptacles for receiving camouflage, the plurality of receptacles configured in a plurality of horizontal rows, wherein the placement of each of the plurality of receptacles in each of the plurality of horizontal rows is staggered with respect to the placement of the plurality of receptacles in the immediately adjacent rows, wherein the plurality of receptacles comprises a strake secured horizontally to the cover, each strake having a length and a width and being secured to the cover at intervals along the length of the strake creating secure points, and wherein the intervals at which each strake is secured to the cover is staggered with respect to the secure points at which each strake is secured to the cover in the immediately adjacent row or rows; and adjusting the height of the frame.

The present invention further is directed to a portable hunting blind comprising: a collapsible frame, wherein: the frame defines an open position and a closed position and, when in the open position, the frame forms a trapezoidal prism having two opposing sides, each having a width, and two opposing ends, each having a width, wherein the width of the two opposing sides is longer than the width of the two opposing ends, and wherein the two opposing sides and the two opposing ends form four corners; the frame further comprises: four legs, wherein one of each of the four legs is positioned at one of the four corners formed by the opposing ends and the opposing sides; at least one end truss positioned between each of the two opposing sides; and at least one side truss positioned between each of the two opposing ends; each of the legs has a length that ranges from about three feet (7.62 cm) to about four feet (10.15 cm); and the legs of the frame are adjustable and further comprise a lock for engaging the legs in a stable position; a cover comprising: a unit of material that swathes the frame, wherein when the hunting blind is assembled for in-use configuration, the unit of material defines a wall of the hunting blind; a plurality of receptacles for receiving camouflage, the plurality of receptacles configured on the wall of the hunting blind in a plurality of horizontal rows, wherein the placement of each of the plurality of receptacles in each of the plurality of horizontal rows is staggered with respect to the placement of the plurality of receptacles in the immediately adjacent row or rows.

The present invention further is directed to a portable hunting blind comprising: a collapsible frame, wherein: the frame defines an open position and a closed position and, when in the open position, the frame forms a trapezoidal prism having two opposing sides, each having a width, and two opposing ends, each having a width, wherein the width of the two opposing sides is longer than the width of the two opposing ends, and wherein the two opposing sides and the two opposing ends form four corners; the frame further comprises: four legs, wherein one of each of the four legs is positioned at one of the four corners formed by the opposing ends and the opposing sides; at least one end truss positioned between each of the two opposing sides; and at least one side truss positioned between each of the two opposing ends; a cover comprising: a unit of material that swathes the frame, wherein when the hunting blind is assembled for in-use configuration, the unit of material defines a wall of the hunting blind; a plurality of receptacles for receiving camouflage, the plurality of receptacles configured on the wall of the hunting blind in a plurality of horizontal rows, wherein the placement of each of the plurality of receptacles in each of the plurality of horizontal rows is staggered with respect to the placement of the plurality of receptacles in the immediately adjacent row or rows; a plurality of gussets for securing the cover to the frame, wherein one of each of the plurality of gussets is positionable over one of the legs of the frame and assists in locating the cover to the frame.

The present invention further is directed to a method of hunting waterfowl, the method comprising the steps of: providing a cover with gussets and a frame with legs; swathing the frame with the cover and aligning the gussets with the legs to provide a taut cover; providing on the cover a plurality of receptacles for receiving camouflage, the plurality of receptacles configured in a plurality of horizontal rows, wherein the placement of each of the plurality of receptacles in each of the plurality of horizontal rows is staggered with respect to the placement of the plurality of receptacles in the immediately adjacent rows, wherein the plurality of receptacles comprises a plurality of strakes secured horizontally to the cover, each strake having a length and a width and being secured to the cover at intervals along the length of the strake creating secure points, and wherein the intervals at which each strake is secured to the cover are staggered with respect to the secure points at which each strake is secured to the cover in the immediately adjacent row or rows.

BRIEF DESCRIPTION OF THE DRAWINGS

FIG. 5 is a side view of one of the legs of the frame of a sample hunting blind constructed in accordance with the present invention.

FIG. 5A is an exploded view of the leg of the frame illustrated in FIG. 5.

FIG. 6 is cross-sectional view of the of the leg of the frame illustrated in FIG. 5 showing the foot of the leg.

FIG. 9 is a side view of the frame of a sample hunting blind constructed in accordance with the present invention, wherein the frame is in a closed or collapsed configuration.

FIG. 10 is another side view of the frame of a sample hunting blind constructed in accordance with the present invention, wherein the frame is in a closed or collapsed configuration.

FIG. 11 is a top view of the frame of a sample hunting blind constructed in accordance with the present invention, wherein the frame is in a closed or collapsed configuration

DETAILED DESCRIPTION OF THE INVENTION

Figure 1:
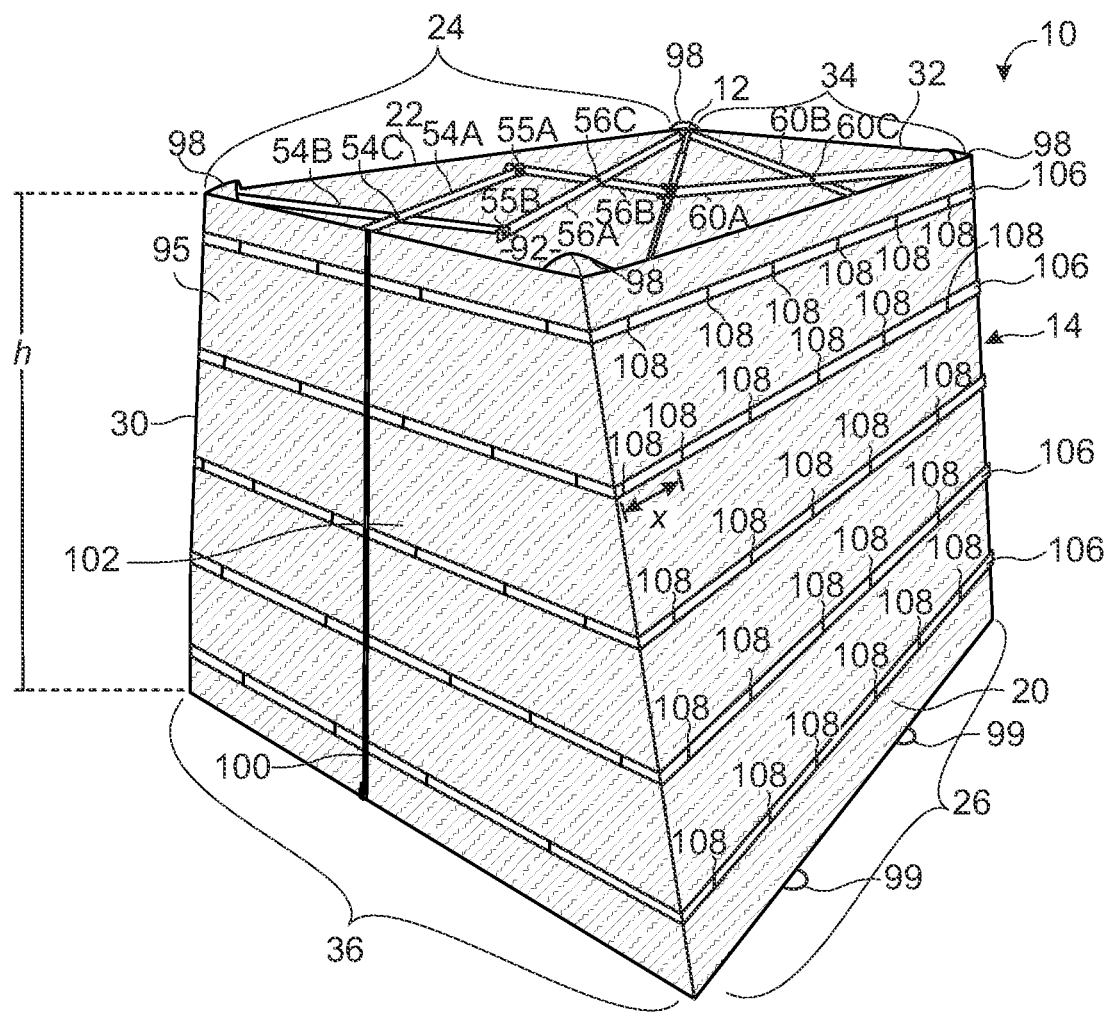
FIG. 1 is a perspective view of a sample hunting blind constructed in accordance with the present invention.

Ground hunting blinds offer numerous advantages to tree stands while concealing the gamesman from the quarry. Mobile, ground-based hunting blinds provide benefits over stationary hunting blinds and tree blinds, but even mobile blinds are difficult to move, particularly during use, and must be dissembled for transport or moved by more than one person. Furthermore, mobility of the hunting blind tends to detract from the effectiveness of the blind and disturbs game.

Camouflage may be applied to hunting blinds, including ground blinds, to help conceal the gamesman through the use of coloration, disguise and mimicry in relation to the environment. Conventional blinds provide stubble straps for attaching vegetation to a hunting blind to conceal the hunter. However, conventional stubble straps generally are thin and narrow, requiring the hunter to remove his gloves in order to place vegetation in the strap.

Moreover, conventional stubble straps, such as those used with conventional layout blinds, do not hold well larger and longer grasses or reed stubble, which simply slide out of the strap. The loop size of conventional stubble straps, such as those used in a layout blind, work well with pea stubble but generally are too small to hold larger and longer grasses in place for more than one hunt. Moving the blind, either during use or transport to another location, often necessitates that the hunter re-camouflage the blind after movement.

Additionally, loose fabric on the blind creates a structure that is not stiff or strong enough to hold camouflage in place and allows the stubble to fall out of the strap. Hunters compensate for this problem by cramming too much vegetation in the stubble strap in an attempt to make it hold. However, over-stuffing stubble straps looks unnatural and discourages game from approaching the blind.

Traditional A-frame blinds are large, heavy, and typically are not conveniently portable, either in the in-use configuration or when dissembled for transport. There currently exist no two-man A-frame blinds that are compact, that are portable by one person in the open or closed mode, or that easily collapse into a compact configuration. Hub blinds can be compact and lightweight but do not offer 360-degree concealment of the hunters. Layout blinds are portable by one person but are only able to hold one hunter.

The subject invention is directed to a hunting blind, particularly, though not exclusively, for waterfowl, that enables hunters to remain concealed while still maneuvering with the blind constructed in an in-use configuration and without disturbing game, including waterfowl. The hunting blind is a ground blind that comprises a portable, collapsible, lightweight frame, enabling the gamesmen to gain closer proximity to small and large game while permitting movement during use without detection. When not in use, the frame of the hunting blind collapses into compact, transportable configuration that slides into a carrying bag for easy transport. The hunting blind of the present invention offers 360 degrees of concealment. The hunting blind of the present invention comfortably conceals two hunters within the interior.

The subject invention further comprises a cover adapted to swathe the frame and create a taut surface against which camouflage may be installed for concealment. The cover comprises a plurality of receptacles configured on the cover of the hunting blind in a plurality of horizontal rows, wherein the placement of each of the plurality of receptacles in each of the plurality of horizontal rows is staggered with respect to the placement of the plurality of receptacles in the immediately adjacent row or rows.

Turning now to the drawings in general, and to FIG. 1 in particular, there is shown therein a perspective view of a hunting blind 10 constructed in accordance with the present invention. The hunting blind comprises a frame 12 and a cover 14. The frame 12 comprises a collapsible, portable, pop-up frame that is easily and conveniently opened and closed. The cover 14 is adapted to swathe the frame 12 and create a taut surface against which camouflage may be installed for concealment in a manner yet to be described.

Figure 2:
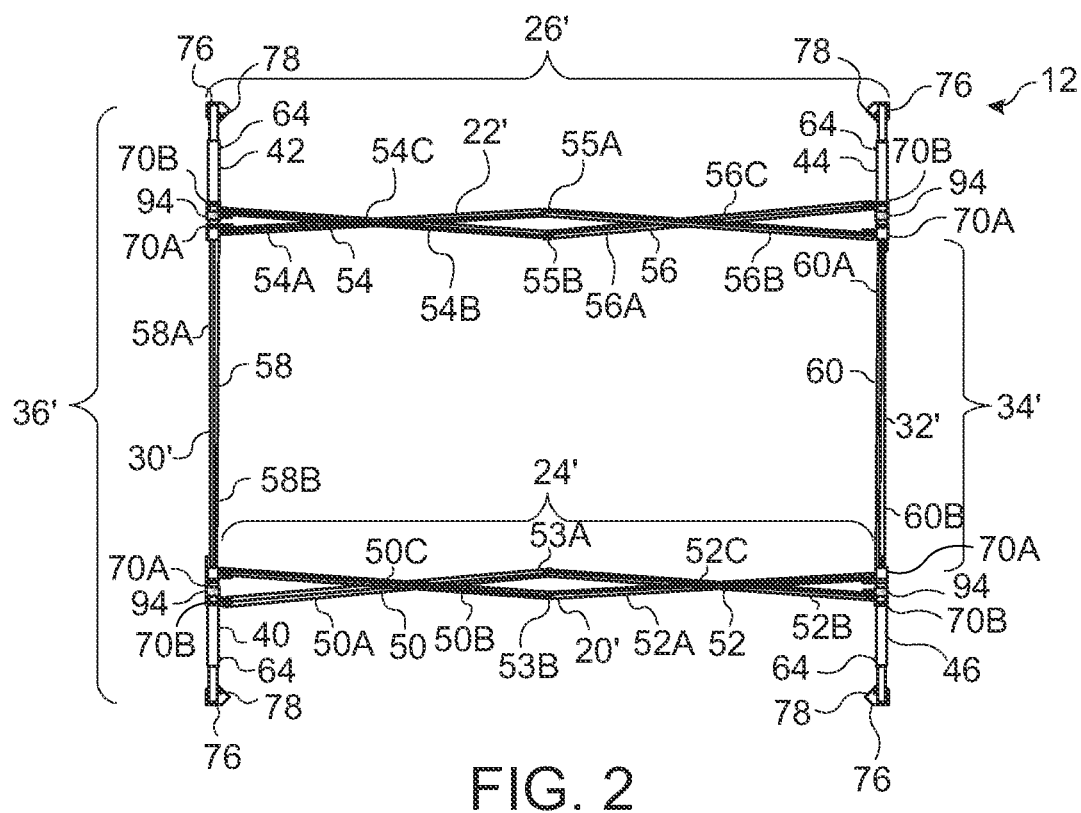
FIG. 2 is a top plan view of the frame of the hunting blind of FIG. 1.
Figure 3:
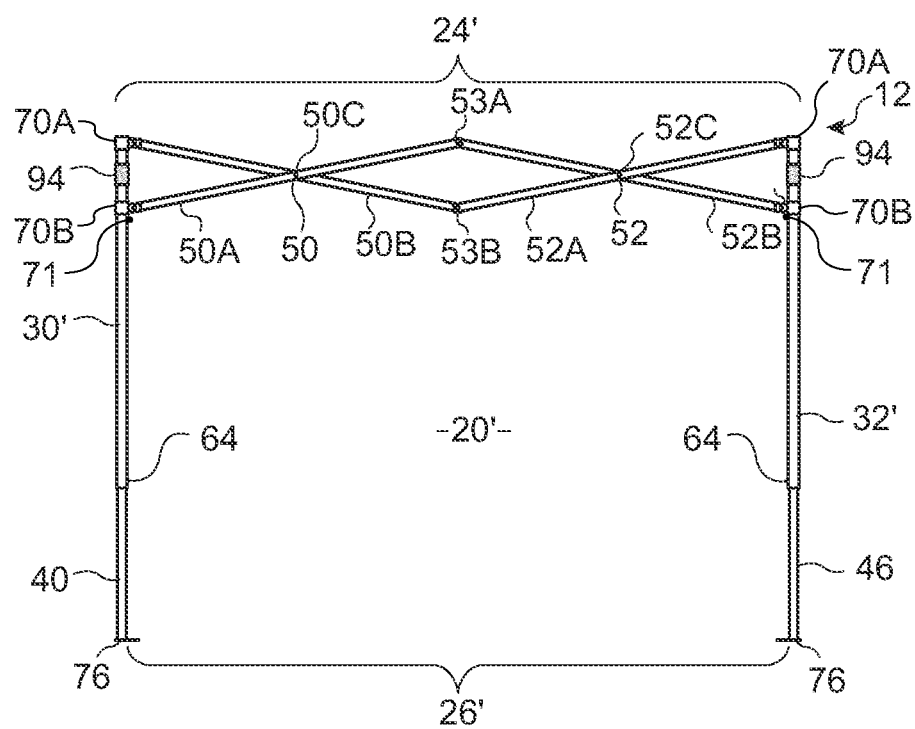
FIG. 3 is a side view of one of the opposing sides of the frame of a sample hunting blind constructed in accordance with the present invention.
Figure 4:
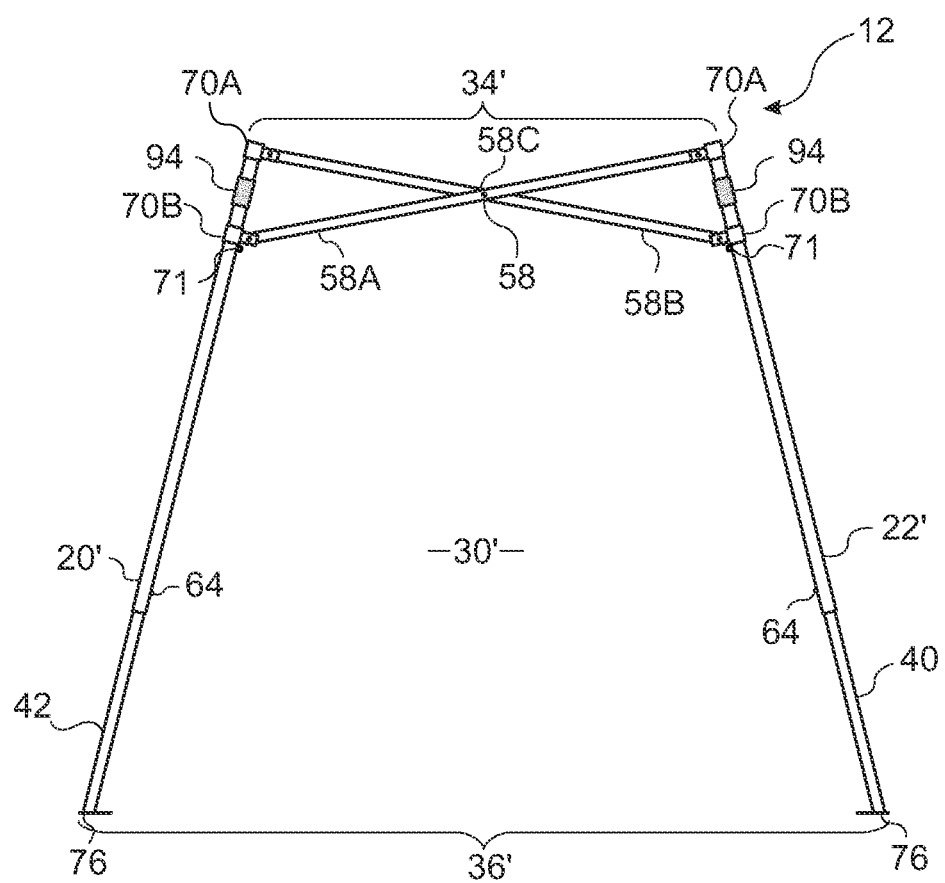
FIG. 4 is a side view of one of the opposing ends of the frame of a sample hunting blind constructed in accordance with the present invention.

With continuing reference to FIG. 1, but turning also to FIGS. 2, 3 and 4, a top view, side view and end view, respectively, are shown of the frame 12. The frame 12 may be any size and shape. In one embodiment of the invention, the hunting blind 10 generally forms a trapezoidal prism with two opposing sides 20 and 22, each having an upper width 24 and a lower width 26, and two opposing ends 30 and 32, each having an upper width 34 and a lower width 36, generally corresponding with elements on the frame 12 with two opposing sides 20' and 22', each having an upper width 24' and a lower width 26', and two opposing ends 30' and 32', each having an upper width 34' and a lower width 36'. The two opposing sides 20 and 22 of the hunting blind 10 are generally rectangular in shape, each having an upper width 24 and a lower width 26 that are approximately equal. The two opposing ends 30 and 32 of the hunting blind 10 are generally trapezoidal in shape, having an upper width 34 that is smaller than the lower width 36, thus creating a generally trapezoidal prism in the overall shape of the hunting blind 10, and the frame 12.

It will be appreciated that the two opposing sides 20 and 22 of the hunting blind 10 may also be considered as the front and the rear sides of the hunting blind, depending on the situation. For example, if the hunting blind 10 is positioned near a tree, opposing side 20 may be adjacent the tree, in which case the opposing side 20 may be considered a rear side while opposing side 22 may be considered a front side.

In one embodiment of the invention, the upper width 24' of the two opposing sides 20' and 22' of the frame 12 ranges from about 4.5 feet (1.376 meters) to about 6.5 feet (1.982 meters), and the lower width 26' of the two opposing sides 20' and 22' ranges from about 4.5 feet (1.376 meters) to about 6.5 feet (1.982 meters), while the upper width 34' of the two opposing ends 30' and 32' ranges from about 2 feet (0.6096 meters) to about 4 feet (1.2192 meters) and the lower width 36' of the two opposing ends 30' and 32' ranges from about 4.5 feet (1.3716 meters) to about 6.5 feet (1.9812 meters). In one embodiment of the invention, the upper width 24' of each of the two opposing sides 20' and 22' measures approximately 5.5 feet (1.6764 meters), and the lower width 26' of each of the two opposing sides 20' and 22' measures approximately 5.5 feet (1.6764 meters), while the upper width 34' of each of the two opposing ends 30' and 32' is approximately 3 feet (0.9144 meters), and the lower width 36' of each of the two opposing ends 30' and 32' is approximately 5 feet (1.524 meters).

When describing the dimensions of the components of the frame 12 and the hunting blind 10, it will be appreciated that the dimensions of the upper width 24' and the lower width 26' of each of the two opposing sides 20' and 22' of the frame 12 generally correspond with the dimensions of the upper width 24 and a lower width 26 of each of the two opposing sides 20 and 22 of the hunting blind 10. Likewise, it will be appreciated that the upper width 34' and the lower width 36' of each of the two opposing ends 30' and 32' generally correspond with the upper width 34 and lower width 36 of each of the two opposing ends 30 and 32 of the hunting blind 10.

Although the shape and size of the hunting blind 10 and its frame 12 are not limited, it will be appreciated that a trapezoidal prism is advantageous, wherein the ratio of the upper width 24 and the lower width 26 of each of the two opposing sides 20 and 22 of the hunting blind 10 is approximately 1:1, and wherein the ratio of the upper width 34 and the lower width 36 of each of the opposing ends 30 and 32 of the hunting blind 10 is approximately 0.6:1. Likewise, the ratio of the upper width 24' and the lower width 26' of each of the two opposing sides 20' and 22' of the frame 12 is approximately 1:1, and wherein the ratio of the upper width 34' and the lower width 36' of each of the opposing ends 30' and 32' of the frame 12 is approximately 0.6:1.

The frame 12 may be made from any materials suited to the particular temperatures, pressures, fluids, topography, climate and other conditions at the site where in use, including aluminum, aluminum alloys, copper, copper alloys, steel, chrome, steel chrome-plated, steel with nickel/silicon carbide composite coating, brass, brass-chrome plated, brass with nickel/silicon carbide composite, stainless steel, stainless chrome-plated, stainless with nickel/silicon carbide composite coating, carbonitrided steel, nickel carbide plated steel, tempered steel and polyvinylchloride.

The convergence of the two opposing sides 20' and 22' and the two opposing ends 30' and 32' of the frame 12 form four corners at which are positioned four legs 40, 42, 44 and 46, wherein one of each of the four legs is positioned at one of the four corners formed by the convergence of the two opposing ends and the two opposing sides. The legs 40, 42, 44 and 46 of the frame 12 are cut to lengths that accommodate a desired height h of the frame 12. To that end, the height h of the frame is determined by the height of the legs 40, 42, 44 and 46, which may be adjustable in height and range from about 3 feet (0.9144 meters) to about 6 feet (1.8288 meters).

Turning now to FIGS. 5, 5A and 6, legs 40, 42, 44 and 46 each further comprise one or more flanges 70A, being fixed, and 70B, being pivotable and slidable, positioned at the upper end 72 of each of the legs, for a purpose yet to be described. Legs 40, 42, 44 and 46 each further may comprise a foot 76 for stabilizing the hunting blind 10 on a substrate. Each of the feet 76 may form an aperture 78 therein for the purpose of tying down the frame 12 and further stabilizing and securing the hunting blind 10 on the substrate. Furthermore, flanges 70A and 70B also further comprise an aperture 80 for a purpose yet to be described.

As shown in FIGS. 2 and 3, at least one side planar truss 50 is positioned between legs 40 and 46 of opposing side 20' and at least one side planar truss 54 is positioned between legs 42 and 44 of opposing side 22'. In one embodiment, for a purpose yet to be described, exactly two side trusses 50 and 52 are positioned between legs 40 and 46 of opposing side 20', and exactly two side trusses 54 and 56 are positioned between legs 42 and 44 of opposing side 22'.

Each of the side trusses 50, 52, 54 and 56 comprise first and second two-force, pivot members 50A and 50B, 52A and 52B, 54A and 54B, and 56A and 56B, respectively, and each pivot member forms an aperture 82 therein for operatively connecting pivot members 50A and 50B, 52A and 52B, 54A and 54B, and 56A and 56B at pivot points 50C, 52C, 54C and 56C, respectively, with screws, nuts, washers, pins and the like, 57, to permit movement and rotation of the pivot members and effectuate opening and closing of the frame 12.

Figure 8A:
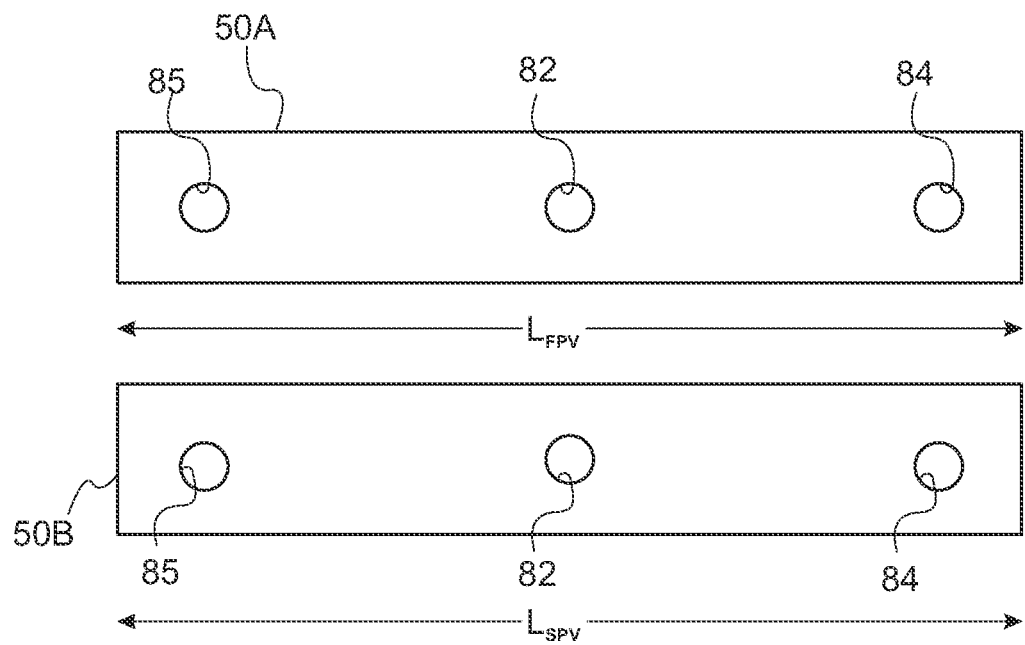
FIGS. 8A and 8B illustrate the placement of apertures in the pivot members of the end trusses of the frame of a sample hunting blind constructed in accordance with the present invention.

As illustrated in FIG. 8A with respect to pivot members 50A and 50B, all pivot members 50A and 50B, 52A and 52B, 54A and 54B and 56A and 56B are approximately equal in length which makes legs 40 and 46 parallel with the other in the open position and legs 42 and 44 parallel with each other in the open position. Furthermore, the approximately equal length of pivot members 50A and 50B, 52A and 52B, 54A and 54B and 56A and 56B, when the frame 12 is in a closed, or collapsed, position also achieves a parallel configuration between all four legs, in a manner yet to be described.

The pivot members 50A and 50B, 52A and 52B, 54A and 54B and 56A and 56B are cut to lengths to achieve the desired dimensions of the frame 12. The length of the pivot members 50A and 50B, 52A and 52B, 54A and 54B and 56A and 56B range from about 24 inches (50.96 cm) to about 48 inches (121.92 cm30). In one embodiment of the invention, the pivot members 50A and 50B, 52A and 52B, 54A and 54B and 56A and 56B of side trusses 50, 52, 54 and 56 are approximately 30 inches in length (76.2 cm).

As illustrated in FIG. 8A with respect to pivot members 50A and 50B, pivot points 50C, 52C, 54C and 56C are positioned substantially centrally along the length of the each of respective pivot members 50A and 50B, 52A and 52B, 54A and 54B and 56A and 56B with screws, nuts, washers, pins and the like. To that end, the respective first and second pivot members 50A and 50B, 52A and 52B, 54A and 54B, and 56A and 56B each form an aperture 82 therein for operatively connecting the first and second pivot members therethrough about respective pivot points 50C, 52C, 54C and 56D. The apertures 82 formed in the first pivot member 50A and the second pivot member 50B of side truss 50 are positioned substantially centrally along the length of the first pivot member 50A $L_{FPV}$ and along the length of the second pivot members $L_{SPV}$, respectively. Likewise, the apertures 82 formed in the each of the first and second pivot members, 52A and 52B, 54A and 54B, and 56A and 56B of trusses 52, 54, and 56 are also positioned substantially centrally along the length $L_{FPV}$ of the first pivot members 52A, 54A and 56A and along the length $L_{SPV}$ of the second pivot members 52B, 54B and 56B, respectively.

Figure 7:
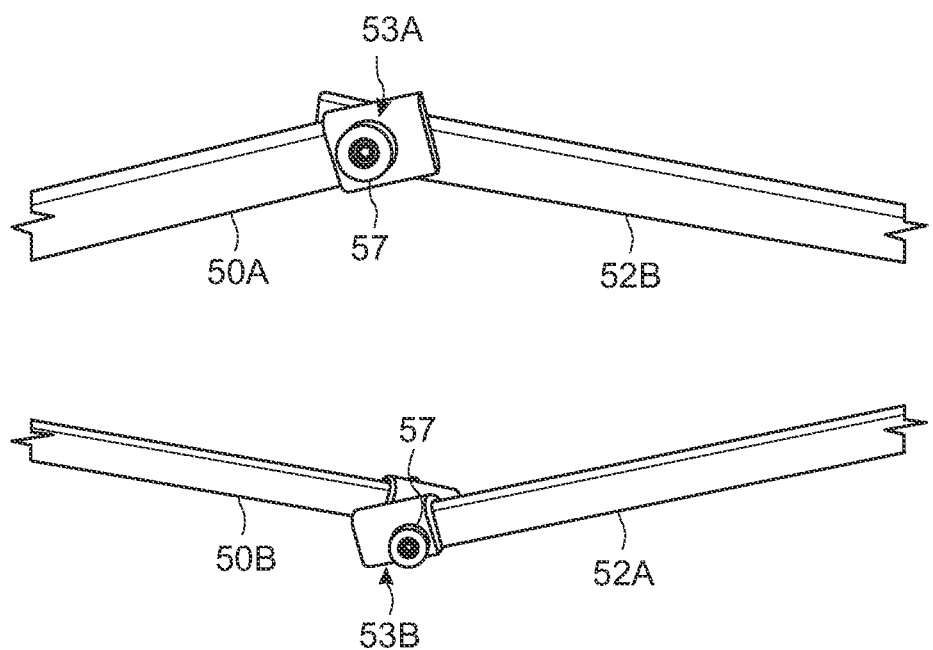
FIG. 7 illustrates a linking mechanism for the side trusses of the frame of a sample hunting blind constructed in accordance with the present invention.

Side trusses 50 and 52 are operatively connected to each other at pivot points 53A and 53B, through apertures 85, while side trusses 54 and 56 are operatively connected to each other at pivot points 55A and 55B with screws, nuts, washers, pins and the like, 57, as shown in FIGS. 7 and 8A.

Returning now to FIG. 4, and with continuing reference to FIGS. 1 and 2, at least one planar end truss 58 is positioned between the legs 40 and 42 of the opposing end 30', and at least one planar end truss 60 is positioned between legs 44 and 46 of the opposing end 32'. End trusses 58 and 60 are comprised of two-force pivot members 58A and 58B and 60A and 60B, respectively, which are operatively connected at pivot points 58C and 60C, respectively, with screws, nuts, washers, pins and the like, 57, to permit movement and rotation of the pivot members to effectuate opening and closing of the frame 12.

Figure 8B:
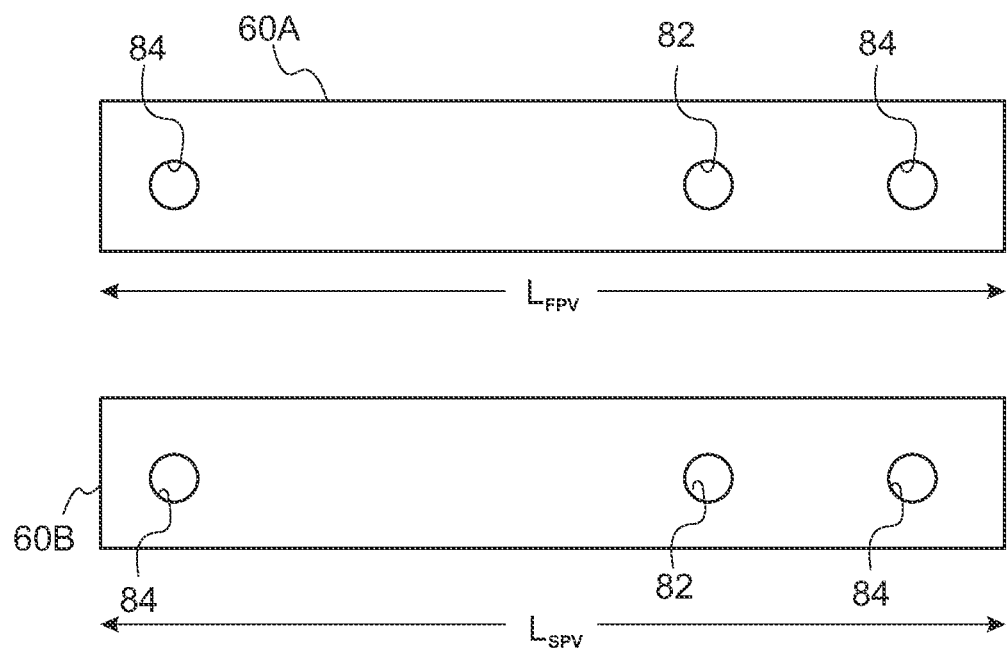
Figure 12:
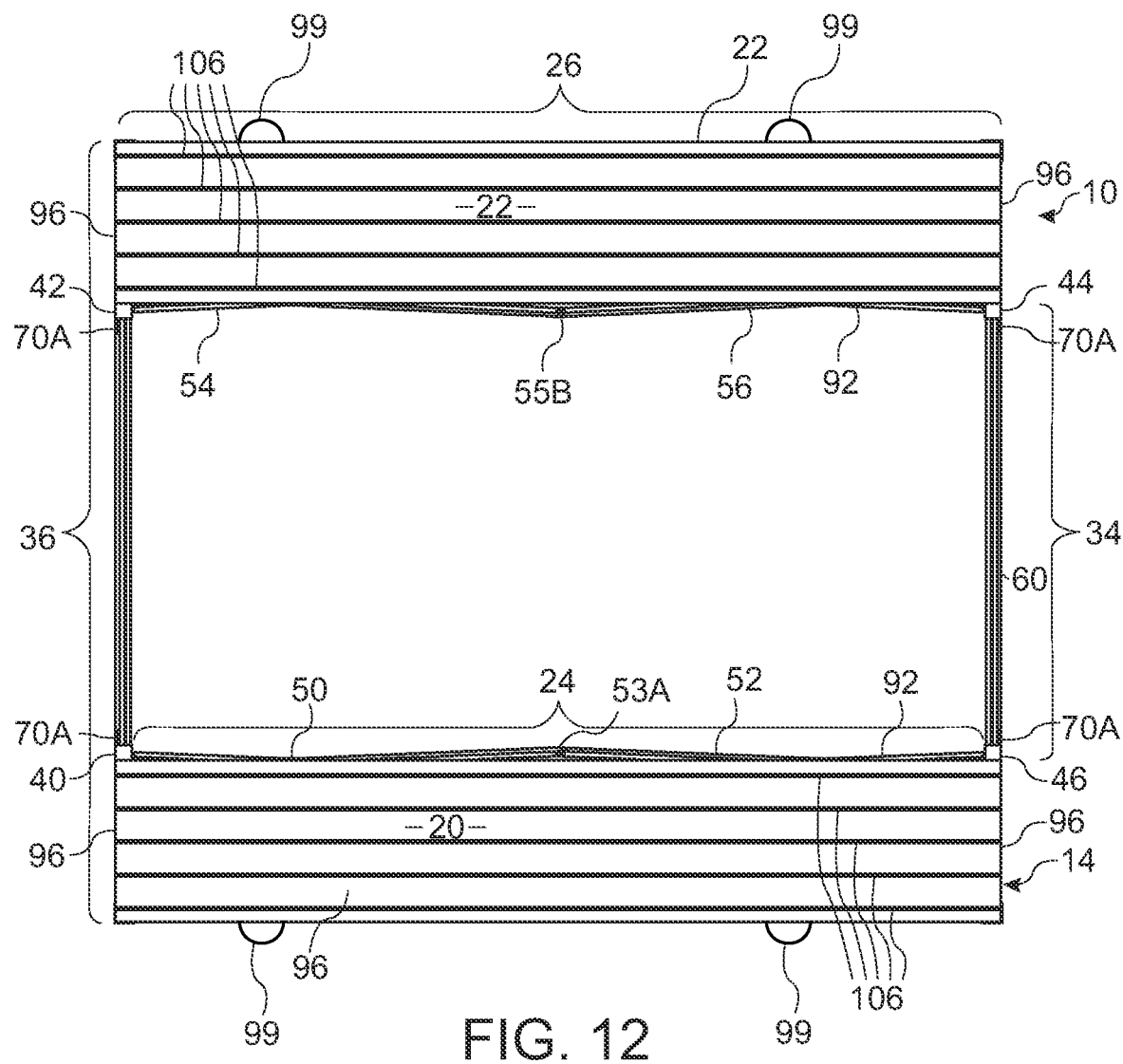
FIG. 12 is partial cutaway, top plan view of a sample hunting blind constructed in accordance with the present invention, with the cover swathed in place on the frame but with the gussets not illustrated so that a top view of the configuration of the legs with respect to the frame and cover is revealed.
Figure 13:
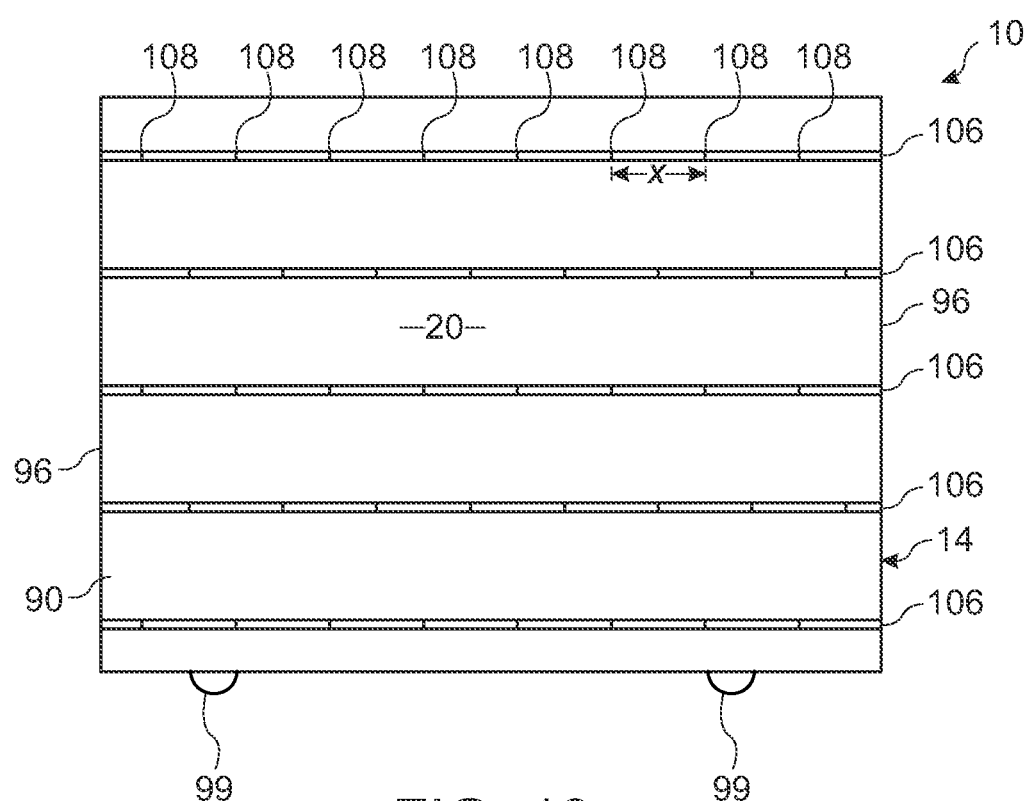
FIG. 13 is a side view of one of the opposing sides of the hunting blind of FIG. 12.
Figure 14:
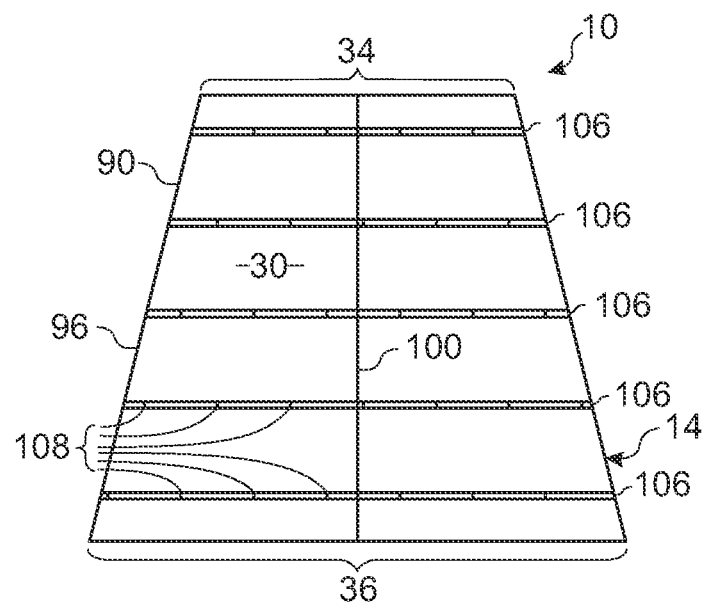
FIG. 14 is a side view of one of the opposing ends of the hunting blind of FIG. 12, showing the installment of a fastener at one opposing end of the hunting blind.
Figure 15:
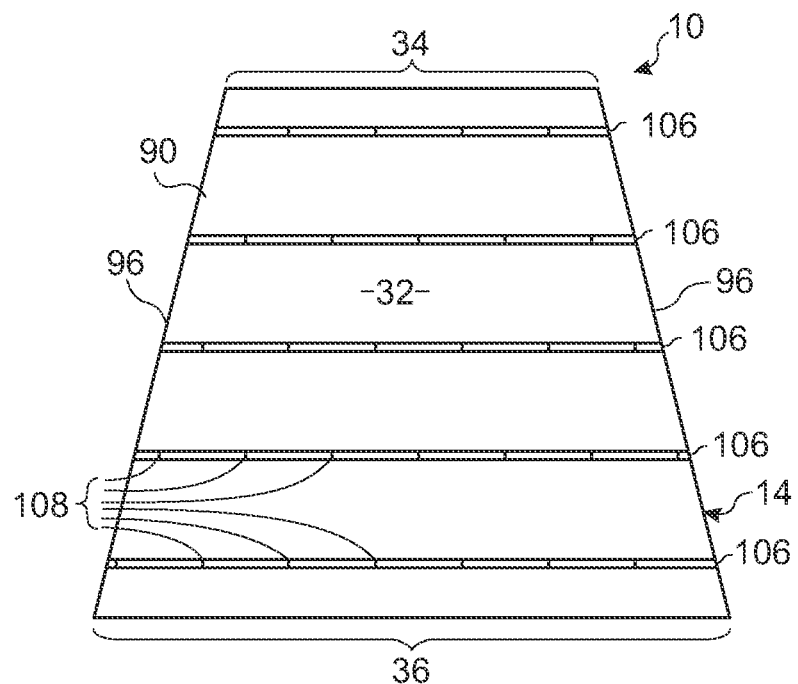
FIG. 15 is a side view of the opposite opposing side of the hunting blind of FIG. 14.

Turning now to FIG. 8B, pivot members 58A and 58B and pivot members 60A and 60B are approximately equal in length. The respective lengths of the pivot members 58A and 58B and of 60A and 60B range from about 24 inches (60.96 cm) to about 48 inches (121.92 cm). In one embodiment of the invention, the pivot members 58A and 58B and pivot members 60A and 60B are approximately 30 inches in length (76.2 cm meters). However, end trusses 58 and 60 each have a modified pivot points 58C and 60C to achieve a lower width 36' that is wider than the upper width 34' of each of the opposing ends 30' and 32' when the frame 12 is in the open position. Apertures 82 formed in the first pivot member 58A of end truss 58 and in the first pivot member 60A of end truss 60 are positioned off-center along the length of the first pivot members 58A and 60A $L_{FPV}$, respectively. Likewise, apertures 82 formed in the second pivot member 58B of truss 58 and in the second pivot member 60B of truss 60 are also positioned off-center along the length of the second pivot members $L_{SPV}$. The amount of the offset of aperture 82 in pivot members 58A and 58B and pivot members 60A and 60B is a function of the lengths of the first pivot members 58A and 60A $L_{FPV}$ and the lengths of the second pivot members 58B and 60B $L_{SPV}$, which in turn are a function of the desired dimensions of the frame 12. In one embodiment of the invention, aperture 82 is offset a distance of about 0.5 inch (1.27 cm) to about 3 inches (7.62 cm) from center of the lengths $L_{FPV}$ and $L_{SPV}$. Thus, it the frame 12, when in the open position, defines a lower width 36' that is wider than the upper width 34' of each of the opposing ends 30' and 32' when the frame 12 is in the open position, and, when in the closed position, defines a compact configuration wherein in all four legs 40, 42, 44 and 46 are parallel.

Turning to FIGS. 9, 10 and 11, it will now be appreciated that, when closed, the frame 12 forms a compact configuration which can be inserted into an exact-fit bag having a shoulder strap, along with the folded cover 14, to be carried easily into the field and set up for use. In one embodiment of the invention, when closed, the dimensions of the frame 12 are approximately 35 inches tall (88.9 cm) by 5 inches wide (12.7 cm) by 6 inches deep (15.24 cm), which yields a lightweight, portable, compact design that is easy to carry and maneuverable between locations.

Returning now to FIGS. 5, 5A, 8A and 8B, it will now be appreciated that side trusses 50, 52, 54 and 56 and end trusses 58 and 60 are connected to legs 40, 42, 44 and 46 via flanges 70A and 70B positioned at the upper end 72 of the legs for operatively connecting the trusses with the legs. Flanges 70A and 70B form apertures 80 which align with apertures 84 in the ends pivot members of trusses 50, 52, 54, 56, 58 and 60 which are attached to legs 40, 42, 44, and 46. Flange 70A is fixed with respect to the respective pivot member of the connected truss, while flange 70B is pivotable with respect to the respective pivot member of the connected truss, is slidable on the leg to which it is attached, and is locked in place on the leg with locking mechanism 71. The frame 12 is thus easily opened with a simple pop-up motion and easily collapsed into a compact, portable configuration.

The legs 40, 42, 44 and 46 of frame 12 are cut to a length to achieve the desired adjustable heights for the hunting blind 10 and range in height h from about 3 feet (0.9144 meters) to about 6 feet (1.8288 meters). Legs 40, 42, 44 and 46 may telescope to permit adjustment of the height h of the legs, and, likewise, the height of the hunting blind 10, and to that end comprise a locking mechanism 64, such as pull pins, push pins or continuous friction locks. In one embodiment of the invention, the height h of the frame 12 is about 35 inches (88.9 cm) when the frame is closed, or collapsed, and 49 inches when the frame is open for the in-use configuration. The frame 12 is thus opened with a simple pop-up movement and effortlessly collapsed into a compact, lightweight, portable configuration by releasing the locking mechanisms 71 and 64.

The selection of the length and the number of trusses comprising the frame 12 is a function of the desired height h of the frame. The length of the pivot members comprising the trusses 50, 52, 54, 56, 58 and 60 will determine the minimum height and the maximum height of the frame 12. In one particular embodiment, the hunting blind 10 is adapted to accommodate a maximum of two hunters in a sitting or kneeling position. In one embodiment, exactly two planar trusses 50 and 52 are positioned between legs 40 and 46 of opposing side 20', and exactly two planar trusses 54 and 56 are positioned between legs 42 and 44 of opposing side 22', while exactly one truss 58 is positioned between legs 40 and 42 of opposing end 30' and exactly one truss 60 is positioned between legs 44 and 46 of opposing end 32', so that the upper width 24' of each of the two opposing sides 20' and 22' measures approximately 5.5 feet (1.6764 meters), and the lower width 26' of each of the two opposing sides 20' and 22' measures approximately 5.5 feet (1.6764 meters), while the upper width 34' of each of the two opposing ends 30' and 32' is approximately 3 feet (0.9144 meters), and the lower width 36' of each of the two opposing ends 30' and 32' is approximately 5 feet (1.524 meters). Such a configuration enables the hunters to repose comfortably within the blind 10 while awaiting their quarry and to maneuver as needed while the blind remains opened in an in-use configuration, without losing camouflage or disturbing waterfowl or game. The hunting blind 10 is portable and lightweight, enabling gamesmen to gain closer proximity to small and large game while permitting movement of the blind 10 without detection.

To further this end, the hunting blind 10 comprises a cover 14 receivable on the frame 12. Turning now to FIGS. 12, 13, 14 and 15, the cover 14 is comprised of a material that wraps around the frame 12 in a manner yet to be described. The cover 14 may comprise a unit of material that swathes the frame wherein, when the hunting blind 10 is assembled for in-use configuration, the unit of material defines the walls of the hunting blind. The unit of material comprising the cover 14 may be one continuous piece of material, or it may be comprised of two or more panels that are assembled together via stitching or other means and wrapped around the frame.

The cover 14 is comprised one or more materials that exhibit properties of durability, strength, water resistance or waterproof properties, fire resistance, wrinkle-resistance, mildew and mold resistance, and stain resistance. A higher denier material typically is denser and provides greater durability and protection. The cover 14 may be comprised of, for example, a material selected from the group consisting of polyester, polyethylene, vinyl, acrylic, cotton, rayon, cotton blends, opaque and translucent fiberglass fabrics, wood fiber materials and combinations of the foregoing.

The cover 14 may display a camouflage pattern 95 to further enhance concealment of the hunting blind 10 from game by blending the hunting blind into the native, natural surroundings. The camouflage pattern will be appropriate for the environment where the hunting blind 10 is to be used. For waterfowl applications, some suitable camouflage patterns include a variety of patterns commonly known as mossy oak, natural and brush. The camouflage pattern may be printed on an exterior surface 90 of the cover 14 or, alternatively, the camouflage pattern may be woven into the material comprising the cover 14. Additionally, the cover 14 material may be laminated or may be coated with vinyl, acrylic or latex or other surface applications. Coating and lamination contribute to the desirable features of durability, strength, water resistance or waterproof properties, fire resistance, wrinkle-resistance, mildew and mold resistance, and stain resistance. Alternatively, the material for the cover 14 may be a dark, opaque material with a camouflage pattern printed on the exterior surface 90.

To further enhance concealment of the hunting blind 10, the cover 14 may comprise one or more primary materials, such as polyester, polyethylene, vinyl, acrylic, cotton, cotton blends, opaque and translucent fiberglass fabrics, wood fiber materials, that is coated or stained on the interior surface 92 of the cover with a dark color, including but not limited to black, brown or dark green, to prevent the cover from being too bright and conspicuous in the natural environment. Suitable interior coatings include vinyl, acrylic and latex. Alternatively, the cover 14 may comprise an overlay material on the exterior 90 of the cover, such as polyester, polyethylene, vinyl, acrylic, cotton, cotton blends, opaque and translucent fiberglass fabrics, wood fiber materials, and an underlay material on the interior surface 92 of the cover, wherein the underlay material is dark in color. The underlay material on the interior surface 92 of the cover 14 may comprise one or more of the materials suitable for the overlay material, or the underlay material may comprise lightproof material, such as ripstop or duvetyne.

In one embodiment of the invention, the cover 14 comprises a lightweight polyester material with a printed camouflage pattern on the exterior surface 90 of the cover. Polyester offers a suitable option for the cover 14 because it is durable and water resistant and will shield occupants of the hunting blind 10 from rain for a reasonable period of time. The polyester fabric may be coated on the interior surface 92 of the cover 14 with a dark vinyl coating that makes the cover UV resistant, waterproof, mildew and mold resistant, stain resistant, flame retardant, durable and strong. Additionally, the dark coating on the interior surface 92 of the cover 14 will diminish the light that passes through the cover and shield the hunting blind 10 and its occupants against excess illumination and exposure to game from natural sunlight.

The cover 14 forms four corners 96 corresponding to the legs 40, 42, 44 and 46. At the upper portion of each corner 96 of the cover 14 is formed a gusset 98 adjacent the top 72 of each leg 40, 42, 44 and 46. One gusset 98 is attachable to each leg 40, 42, 44 and 46, which further secures the removable connection between the cover 14 and the frame 12. The gussets 98 may be comprised of the same materials as the cover 14 or may comprise a different material. The gussets assist locating the cover 14 to the frame 12 and in tightly attaching the interior surface 92 of the cover to the frame.

The cover 14 is adapted to swathe the frame 12 and create a taut surface against which camouflage may be installed on the cover 14 for additional concealment of the hunting blind 10. To that end, the interior surface 92 of the cover 14 is removably attachable to the frame 12 with fasteners 94 positionable at strategic locations. Fasteners 94 may comprise hook-and-loop fasteners, touch fasteners, dual lock, or elastic with a plastic hook.

Figure 16A:
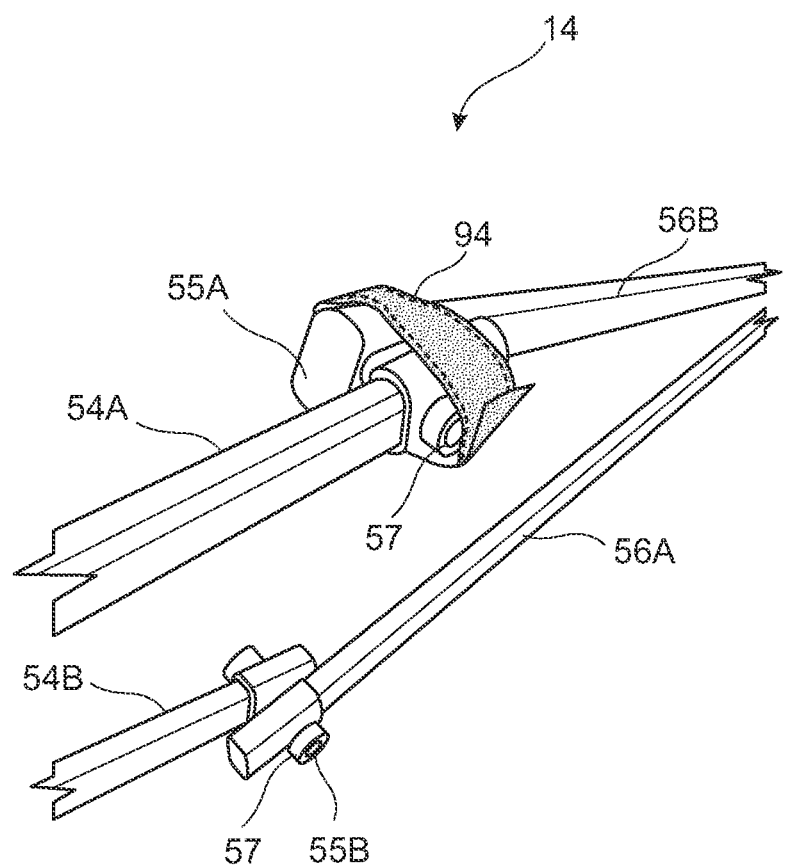
FIG. 16A illustrates a sample use of a fastener to secure the cover to one of the trusses of the hunting blind of the present invention.
Figure 16B:
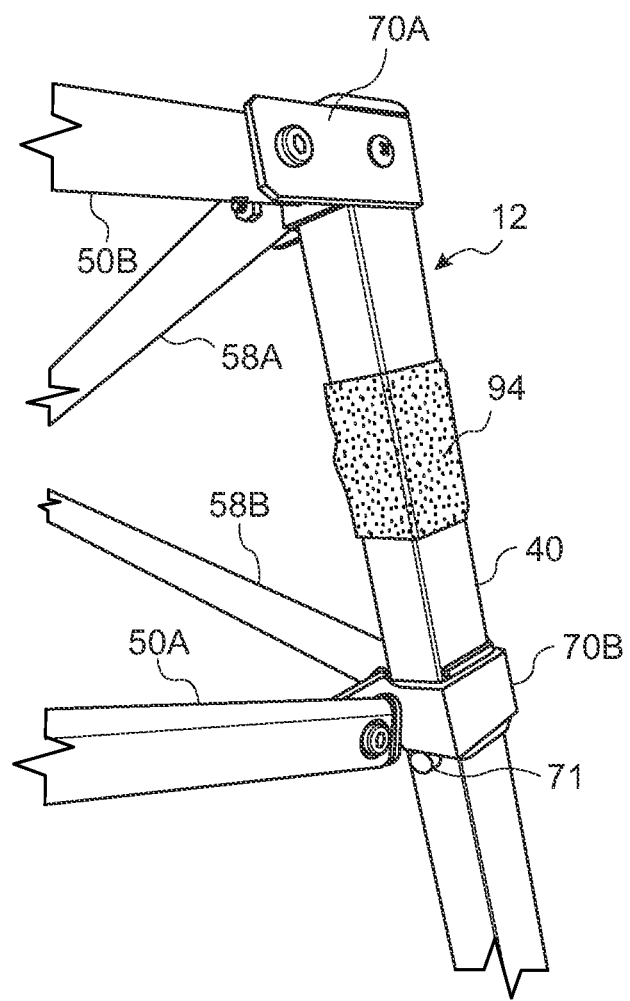
FIG. 16B illustrates a sample use of a fastener to secure the cover to the legs of the hunting blind of the present invention.
Figure 16C:
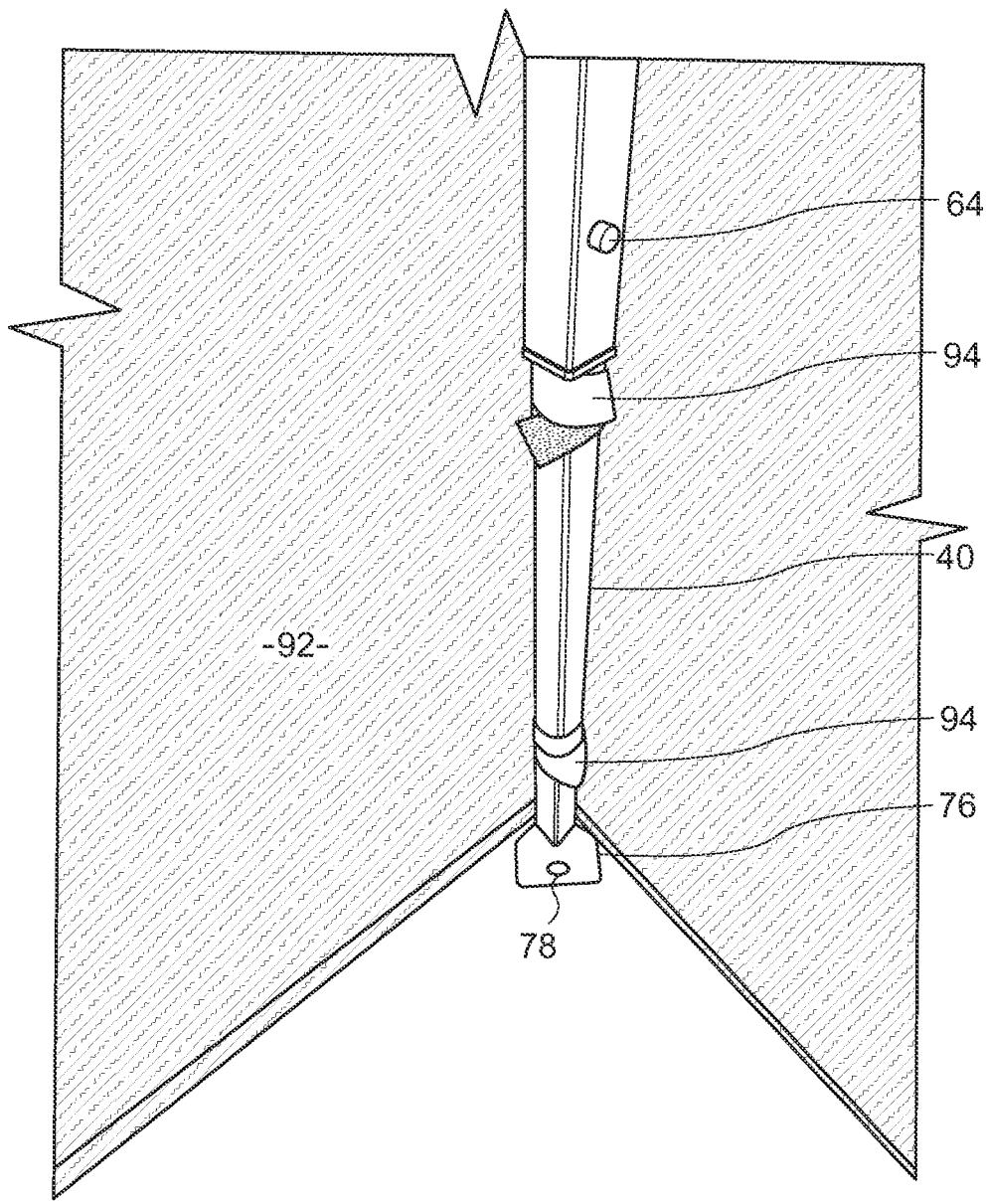
FIG. 16C illustrates a sample use of a fastener to secure the cover to the legs of the hunting blind of the present invention.

Fasteners 94 are positioned at strategic locations on the cover 14 that correspond to fasteners 94 strategically positioned on the frame 12. For example, fasteners 94 comprising hook-and-loop fasteners may be sewn into the interior surface 92 of the cover 14 to wrap around the trusses 50, 52, 54, 56, 58 and 60 of the frame 12 at desired locations as shown, by way of example, in FIG. 16A. Additionally, at each corner 96 of the cover 14, fasteners 94 are sewn to the interior 92 of the cover for the purpose of fastening the cover around each leg 40, 42, 44, 46 as shown, by way of example, in FIGS. 16B and 16C. By way of example, multiple 4 inch (10.16 cm) square components of hook-and-loop fasteners 94 may be sewn to the interior surface 92 of the cover 14 which correspond with the mating component of hook-and-loop fasteners attached to the tops 72 or the stationary portions of legs 40, 42, 44, and 46 of the frame 12. At the bottom of all four corners 96, hook-and-loop fasteners 94 are sewn to the cover 14, allowing the hook-and-loop fasteners 94 to be wrapped around each leg 40, 42, 44 and 46, and these fasteners attach to the telescoping portions of the legs. In one embodiment of the invention, the distance between the fasteners 94 on the legs 41, 42, 44 and 46 is 15 inches (38.1 cm).

Near the bottom of the cover 14, in the front and back of the interior surface 92 of the cover is a loop or strap 99 attached to the cover for the purpose of using a stake to better secure the blind 10 to the substrate. The loop 99 could be a fabric strap sewn into the blind, metal rings or D-rings, or other loop through which a stake can be driven.

The unit of material comprising the cover 14 has first and second ends and wraps around the entire frame 12, for the purpose of swathing and securing the cover thereon, with the first and second ends of the unit of material meeting at one of the two opposing ends 30 or 32. In one embodiment of the invention, the ends of the unit of material of the cover 14 meet at opposing end 30, where the first and seconds ends are attached by fastener 100, such as a zipper. Alternatively, the fastener 100 may comprise one or more hook-and-loop fasteners, touch fasteners, dual lock and or elastic with a plastic hook.

Figure 17:
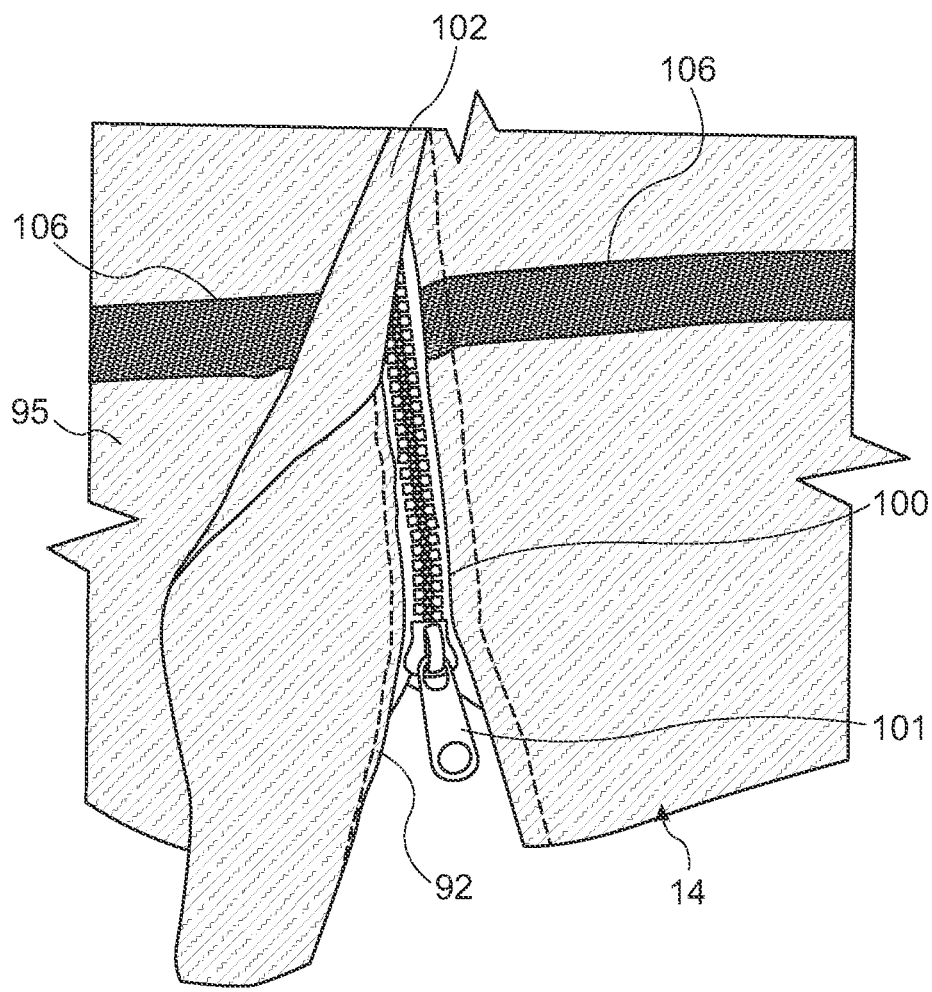
FIG. 17 illustrates a sample fastener for securing the cover to the frame of a sample hunting blind of the present invention.

In one embodiment of the invention, the fastener 100 comprises a double-tongued plastic zipper, as shown in FIG. 17. Plastic is helpful to minimize development of rust, and the double-tongue enables operation of the zipper 100 from either the interior or the exterior the hunting blind 10. The cover 14 may further comprise a placket 102 to conceal the fastener 100. The placket 102 runs the entire length of the zipper 100 on the exterior surface 90 of the cover 14 for the purpose of concealing the zipper. The placket 102 may be made of the same material as the cover 14 and preferably comprises a camouflage pattern to fourth conceal the zipper 100. In one embodiment of the invention, the zipper 100 is installed from the top of the hunting blind 10 and, to close, zips down toward the substrate on which the hunting blind rests. To enter the hunting blind 10, the hunter unzips the cover 14 from the bottom, and ducks under the frame 12.

On the exterior surface 92 of the cover 14, are a plurality of receptacles for receiving camouflage, the plurality of receptacles configured on the exterior surface of the hunting blind in a plurality of horizontal rows, wherein the placement of each of the plurality of receptacles in each of the plurality of horizontal rows is staggered with respect to the placement of the plurality of receptacles in the immediately adjacent row or rows. The plurality of receptacles for receiving camouflage may comprise a strake, a tension strap, a pocket, a pouch, a band, a belt, a leash, a buckle or a tie. In one embodiment of the invention, each of the plurality of receptacles comprises a strake 106 secured horizontally to the exterior surface 90 of the hunting blind 10, each strake 106 having a length and a width and being secured to the wall of the hunting blind at a plurality of secure points 108 distanced by an interval x along the length of the strake, and wherein the plurality of points by which each strake 106 is secured to the exterior surface 92 of the hunting blind 10 are staggered with respect to the plurality of secure points 108 of the strake 106 in the immediately adjacent row or rows. As used herein, a "strake" means a continuous band of material.

The strakes 106 are secured to the exterior surface 90 of the cover 14 in specific locations adapted to create a realistic and natural environmental setting with camouflage. In one embodiment of the invention, the strakes 106 comprise a strip of material that ranges from 0.5 inches (1.27 meters) to 2 inches (5.08 cm) in width and is stitched or sewn to the cover 14 at secure points 108 spaced at intervals x therebetween. The interval x between the secure points 108 of the strake 106 ranges from about 8 inches (20.32 centimeters) to about 12 inches (30.48 centimeters) for the purpose of applying natural vegetation between the cover 14 and the strake 106. It also is desirable that the interval x between secure points 108 is wide enough to accommodate a hunter's gloved hand while inserting camouflage into the strake 106. The materials from which strakes 106 are made includes nylon, polyester, elastic, cotton and cotton blends. The secure points 108 of strakes 106 are stitched to the cover 14 with thread, adhesive or hook-and loop fasteners. The strakes 106 may be a continuous band of material that circumvents the entire hunting blind in one continuous, integral sheet, or the strake may be a continuous band of material that spans one of the opposing sides or one of the opposing ends and which is connected at the corners 96 to a strake on the adjacent opposing side or opposing end, as the case may be.

One embodiment of the invention consists of five strakes 106 comprised of ¾ inch (0.975 cm) nylon strap sewn horizontally around the perimeter of the cover 14. A first strake 106 is secured about four inches (10.16 cm) below the top of the hunting blind 10, and subsequent strakes 106 are stitched horizontally onto the cover every ten inches (25.4 cm) therebelow to allow the attachment of natural vegetation or artificial camouflage. All strakes 106 circumvent the hunting blind 10 horizontally around the perimeter of the cover 14 and permit the hunting blind to be completely covered with camouflage.

The secure points 108 of one strake 106 form an alternating, or bricklayer, pattern with respect to the secure points 108 of the immediately adjacent strake or strakes 106. It is desirable that the secure points 108 misalign vertically to permit the camouflage attached in one strake 106 to cover the stitch points of one or more of the strakes 106 above it. This creates an organic, natural appearance in the arrangement of the camouflage on the exterior surface 90 of the cover 14 and enhances concealment of the hunting blind 10 from game and waterfowl.

In operation of the invention, a hunter removes the frame 12 from a carrying bag or case (not shown) and pops open the frame. The legs 40, 42, 44 and 46 are adjusted to the desired height and secured in place with locking mechanisms 64. The cover 14 is securely swathed on the frame 12 with fasteners 94 and gussets 98. Gussets 98 are aligned with the tops 72 of the legs 40, 42, 44 and 46 to create a smooth and taut exterior surface 90. The unit of material comprising the cover is wrapped around the frame and secured to the frame with coordinating fasteners 94 positioned strategically on the cover and the frame. The cover is closed with a fastener or zipper 100. The properties of the material or materials from which the cover 14 is made, fasteners 94, gussets 98 and zipper 100 all work in tandem to create a strong, taut surface adapted to securely receive and hold camouflage in place on the hunting blind 10. To that end, natural camouflage comprising native stubble and field vegetation, or artificial camouflage, are placed in the strakes 106 between the secure points 108 on the cover 14 in horizontal rows around the perimeter of the hunting blind. The camouflage is secured within the strakes 106 in a staggered pattern to further conceal the hunting blind from game and waterfowl. The hunting blind is lightweight and maneuverable and may be deployed in the open, in-use configuration to a nearby location without losing camouflage and without startling the hunter's quarry. The hunting blind 10 is closed by removing the camouflage and collapsing the frame 12 by releasing the locking mechanisms 64, which quickly and easily fold the frame into a compact configuration with all four legs in parallel. The collapsed frame 12 can be inserted into an exact-fit bag having a shoulder strap, along with the folded cover 14, and carried easily to another location or stored for later use.

It now will be appreciated that the present invention presents a hunting blind, particularly, though not exclusively, for waterfowl, that enables hunters to remain concealed while still maneuvering with the blind constructed in an in-use configuration and without disturbing game. The hunting blind is a ground blind that comprises a portable, collapsible, lightweight frame, enabling the gamesmen to gain closer proximity to small and large game while permitting movement during use without detection. When not in use, the frame of the hunting blind collapses into compact, transportable configuration that slides into a carrying bag for easy transport.

The subject invention further comprises a cover adapted to swathe the frame and create a taut, strong surface to which camouflage may be installed for concealment of the hunting blind. The cover comprises a plurality of receptacles configured on the cover of the hunting blind in a plurality of horizontal rows, wherein the placement of each of the plurality of receptacles in each of the plurality of horizontal rows is staggered with respect to the placement of the plurality of receptacles in the immediately adjacent row or rows.

The invention has been described above both generically and with regard to specific embodiments. Although the invention has been set forth in what has been believed to be preferred embodiments, a wide variety of alternatives known to those of skill in the art can be selected with a generic disclosure. Changes may be made in the combination and arrangement of the various parts, elements, steps and procedures described herein without departing from the spirit and scope of the invention as defined in the following claims.

I claim:

1. A portable hunting blind comprising:
    a collapsible frame, wherein:
        the frame defines an open position and a closed position and, when in the open position, the frame forms a trapezoidal prism having two opposing sides, each having a width, and two opposing ends, each having a width, wherein the width of the two opposing sides is greater than the width of the two opposing ends, and wherein the two opposing sides and the two opposing ends form four corners; and
        the frame comprises:
            four legs, wherein one of each of the four legs is positioned at one of the four corners formed by the opposing ends and the opposing sides;
            at least one end truss positioned between each of the two opposing sides,
                wherein:
                    the at least one end truss comprises first and second pivot members of substantially equal length which are operatively connected about a pivot point; and
                    the first and second pivot members of the at least one end truss positioned between each of the two opposing sides each form an aperture therein for operatively connecting the first and second pivot members about the pivot point;
                    the aperture formed in each of the first and second pivot members of the at least one end truss positioned between each of the two opposing sides is positioned off-center along the respective lengths of each of the first and second pivot members;
            at least one side truss positioned between each of the two opposing ends;
            the frame, when in the closed position, defines a compact configuration wherein in all four legs are parallel; and
        a cover comprising:
            a unit of material that swathes the frame, wherein when the hunting blind is assembled for in-use configuration, the unit of material defines a wall of the hunting blind;
            a plurality of receptacles for receiving camouflage, the plurality of receptacles configured on the wall of the hunting blind in a plurality of horizontal rows, wherein the placement of each of the plurality of receptacles in each of the plurality of horizontal rows is staggered with respect to the placement of the plurality of receptacles in the immediately adjacent row or rows.

2. The hunting blind of claim 1 wherein each of the plurality of receptacles comprises a strake secured horizontally to the wall of the hunting blind, each strake having a length and a width and being secured to the wall of the hunting blind at intervals along the length of the strake creating secure points, and wherein the intervals at which each strake is secured to the wall of the hunting blind is staggered with respect to the secure points at which each strake is secured to the wall in the immediately adjacent row or rows.

3. The hunting blind of claim 1 wherein each of the plurality of receptacles for receiving camouflage comprises a strake, a tension strap, a pocket, a pouch, a band, a belt, a leash, a buckle or a tie.

4. The hunting blind of claim 2 wherein the distance between the intervals at which each strake is secured to the wall of the hunting blind ranges from about 8 inches (20.32 centimeters) to about 12 inches (30.48 centimeters).

5. The hunting blind of claim 1 wherein the cover is made from a material that comprises a single layer of material having an exterior side imprinted with a camouflage pattern and having an interior side coated with an opaque material.

6. The hunting blind of claim 1 wherein the material is selected from the group consisting of polyester, polyethylene, vinyl, acrylic, cotton, cotton blends, opaque and translucent fiberglass fabrics, wood fiber materials, ripstop or duvetyne.

7. The hunting blind of claim 1 wherein the cover is made from more than one material and comprises an overlay material and an underlay material, wherein the overlay material has a camouflage pattern and wherein the underlay material is opaque.

8. The hunting blind of claim 1 wherein exactly one end truss is positioned between each of the two opposing sides and wherein exactly two side trusses are positioned between each of the two opposing ends.

9. The hunting blind of claim 1 wherein each of the legs have a length that ranges from about three feet (7.62 cm) to about four feet (10.15 cm).

10. The hunting blind of claim 9 wherein the legs of the frame are adjustable and further comprise a lock for engaging the legs in a stable position.

11. The hunting blind of claim 1 wherein the unit of material is a continuous piece of material and further comprises a fastener for securely swathing the cover on the frame.

12. The hunting blind of claim 11 wherein the unit of material comprising the cover further comprises a placket to conceal the fastener.

13. The hunting blind of claim 11 wherein the fastener is a zipper and wherein the cover is installed on the frame so that the zipper is positioned at one of the two opposing ends.

14. The hunting blind of claim 13 wherein the frame forms a bottom when in the open position and wherein the zipper opens from the bottom of the frame when the frame is in the open position.

15. The hunting blind of claim 1 wherein the cover further comprises a plurality of gussets for securing the cover to the frame, wherein one of each of the plurality of gussets is positionable over one of the legs of the frame and assists in locating the cover to the frame.

16. The hunting blind of claim 1 wherein the frame is portable in the closed positioned.

17. The hunting blind of claim 1 further characterized in that the hunting blind is portable while assembled for in-use configuration.

18. A method of hunting waterfowl, the method comprising the steps of:
providing a cover and a collapsible frame;
swathing the frame with the cover to provide a taut surface;
providing on the cover a plurality of receptacles for receiving camouflage, the plurality of receptacles configured in a plurality of horizontal rows, wherein the placement of each of the plurality of receptacles in each of the plurality of horizontal rows is staggered with respect to the placement of the plurality of receptacles in the immediately adjacent rows, wherein the plurality of receptacles comprises a strake secured horizontally to the cover, each strake having a length and a width and being secured to the cover at intervals along the length of the strake creating secure points, and wherein the intervals at which each strake is secured to the cover is staggered with respect to the secure points at which each strake is secured to the cover in the immediately adjacent row or rows; and
adjusting the height of the frame.

19. The method of claim 18 further comprising the step of installing camouflage in the strakes between the secure points.

20. The method of claim 19 wherein the step of providing camouflage further comprises providing camouflage in the strakes between the secure points on the cover in horizontal rows.

21. The method of claim 20 further comprising the step of moving the frame while the frame is in an open in-use configuration.

22. The method of claim 18 wherein the step of providing a frame further comprises providing a frame with legs and wherein the step of providing a strake secured horizontally to the cover further comprises swathing the cover on the frame with gussets aligned with the legs to create a smooth and taut cover.

23. The method of claim 22 wherein the cover is swathed to the frame with a zipper.

24. The method of claim 22 further comprising the steps of providing at least one locking mechanism on at least one of the legs of the frame, removing the cover and collapsing the frame by releasing the at least one locking mechanism.

25. A portable hunting blind comprising:
a collapsible frame, wherein:
the frame defines an open position and a closed position and, when in the open position, the frame forms a trapezoidal prism having two opposing sides, each having a width, and two opposing ends, each having a width, wherein the width of the two opposing sides is longer than the width of the two opposing ends, and wherein the two opposing sides and the two opposing ends form four corners;
the frame further comprises:
four legs, wherein one of each of the four legs is positioned at one of the four corners formed by the opposing ends and the opposing sides;
at least one end truss positioned between each of the two opposing sides; and
at least one side truss positioned between each of the two opposing ends;
each of the legs has a length that ranges from about three feet (7.62 cm) to about four feet (10.15 cm); and
the legs of the frame are adjustable and further comprise a lock for engaging the legs in a stable position;
a cover comprising:
a unit of material that swathes the frame, wherein when the hunting blind is assembled for in-use configuration, the unit of material defines a wall of the hunting blind;
a plurality of receptacles for receiving camouflage, the plurality of receptacles configured on the wall of the hunting blind in a plurality of horizontal rows, wherein the placement of each of the plurality of receptacles in each of the plurality of horizontal rows is staggered with respect to the placement of the plurality of receptacles in the immediately adjacent row or rows.

26. The hunting blind of claim 25 wherein each of the plurality of receptacles comprises a strake secured horizontally to the wall of the hunting blind, each strake having a length and a width and being secured to the wall of the hunting blind at intervals along the length of the strake creating secure points, and wherein the intervals at which each strake is secured to the wall of the hunting blind is staggered with respect to the secure points at which each strake is secured to the wall in the immediately adjacent row or rows.

27. The hunting blind of claim 26 wherein the distance between the intervals at which each strake is secured to the wall of the hunting blind ranges from about 8 inches (20.32 centimeters) to about 12 inches (30.48 centimeters).

28. The hunting blind of claim 25 wherein each of the plurality of receptacles for receiving camouflage comprises a strake, a tension strap, a pocket, a pouch, a band, a belt, a leash, a buckle or a tie.

29. The hunting blind of claim 25 wherein the cover is made from a material that comprises a single layer of material having an exterior side imprinted with a camouflage pattern and having an interior side coated with an opaque material.

30. The hunting blind of claim 25 wherein the material is selected from the group consisting of polyester, polyethylene, vinyl, acrylic, cotton, cotton blends, opaque and translucent fiberglass fabrics, wood fiber materials, ripstop or duvetyne.

31. The hunting blind of claim 25 wherein the cover is made from more than one material and comprises an overlay material and an underlay material, wherein the overlay material has a camouflage pattern and wherein the underlay material is opaque.

32. The hunting blind of claim 25 wherein exactly one end truss is positioned between each of the two opposing sides and wherein exactly two side trusses are positioned between each of the two opposing ends.

33. The hunting blind of claim 25 wherein:
the at least one end truss positioned between each of the two opposing sides comprises first and second pivot members of substantially equal length which are operatively connected about a pivot point;
the first and second pivot members of the at least one end truss positioned between each of the two opposing sides each form an aperture therein for operatively connecting the first and second pivot members about the pivot point;
the aperture formed in each of the first and second pivot members of the at least one end truss positioned between each of the two opposing sides is positioned off-center along the respective lengths of each of the first and second pivot members; and
the frame, when in the closed position, defines a compact configuration wherein in all four legs are parallel.

34. The hunting blind of claim 25 wherein the unit of material is a continuous piece of material and further comprises a fastener for securely swathing the cover on the frame.

35. The hunting blind of claim 34 wherein the unit of material comprising the cover further comprises a placket to conceal the fastener.

36. The hunting blind of claim 34 wherein the fastener is a zipper and wherein the cover is installed on the frame so that the zipper is positioned at one of the two opposing ends.

37. The hunting blind of claim 36 wherein the frame forms a bottom when in the open position and wherein the zipper opens from the bottom of the frame when the frame is in the open position.

38. The hunting blind of claim 25 wherein the cover further comprises a plurality of gussets for securing the cover to the frame, wherein one of each of the plurality of gussets is positionable over one of the legs of the frame and assists in locating the cover to the frame.

39. The hunting blind of claim 25 wherein the frame is portable in the closed positioned.

40. The hunting blind of claim 25 further characterized in that the hunting blind is portable while assembled for in-use configuration.

41. A portable hunting blind comprising:
a collapsible frame, wherein:
the frame defines an open position and a closed position and, when in the open position, the frame forms a trapezoidal prism having two opposing sides, each having a width, and two opposing ends, each having a width, wherein the width of the two opposing sides is longer than the width of the two opposing ends, and wherein the two opposing sides and the two opposing ends form four corners;
the frame further comprises:
four legs, wherein one of each of the four legs is positioned at one of the four corners formed by the opposing ends and the opposing sides;
at least one end truss positioned between each of the two opposing sides; and
at least one side truss positioned between each of the two opposing ends;
a cover comprising:
a unit of material that swathes the frame, wherein when the hunting blind is assembled for in-use configuration, the unit of material defines a wall of the hunting blind;
a plurality of receptacles for receiving camouflage, the plurality of receptacles configured on the wall of the hunting blind in a plurality of horizontal rows, wherein the placement of each of the plurality of receptacles in each of the plurality of horizontal rows is staggered with respect to the placement of the plurality of receptacles in the immediately adjacent row or rows;
a plurality of gussets for securing the cover to the frame, wherein one of each of the plurality of gussets is positionable over one of the legs of the frame and assists in locating the cover to the frame.

42. The hunting blind of claim 41 wherein each of the plurality of receptacles comprises a strake secured horizontally to the wall of the hunting blind, each strake having a length and a width and being secured to the wall of the hunting blind at intervals along the length of the strake creating secure points, and wherein the intervals at which each strake is secured to the wall of the hunting blind is staggered with respect to the secure points at which each strake is secured to the wall in the immediately adjacent row or rows.

43. The hunting blind of claim 42 wherein each of the plurality of receptacles for receiving camouflage comprises a strake, a tension strap, a pocket, a pouch, a band, a belt, a leash, a buckle or a tie.

44. The hunting blind of claim 42 wherein the distance between the intervals at which each strake is secured to the wall of the hunting blind ranges from about 8 inches (20.32 centimeters) to about 12 inches (30.48 centimeters).

45. The hunting blind of claim 41 wherein the cover is made from a material that comprises a single layer of material having an exterior side imprinted with a camouflage pattern and having an interior side coated with an opaque material.

46. The hunting blind of claim 41 wherein the material is selected from the group consisting of polyester, polyethylene, vinyl, acrylic, cotton, cotton blends, opaque and translucent fiberglass fabrics, wood fiber materials, ripstop or duvetyne.

47. The hunting blind of claim 41 wherein the cover is made from more than one material and comprises an overlay material and an underlay material, wherein the overlay material has a camouflage pattern and wherein the underlay material is opaque.

48. The hunting blind of claim 41 wherein exactly one end truss is positioned between each of the two opposing sides and wherein exactly two side trusses are positioned between each of the two opposing ends.

49. The hunting blind of claim 41 wherein:
the at least one end truss positioned between each of the two opposing sides comprises first and second pivot members of substantially equal length which are operatively connected about a pivot point;
the first and second pivot members of the at least one end truss positioned between each of the two opposing sides each form an aperture therein for operatively connecting the first and second pivot members about the pivot point;

the aperture formed in each of the first and second pivot members of the at least one end truss positioned between each of the two opposing sides is positioned off-center along the respective lengths of each of the first and second pivot members; and the frame, when in the closed position, defines a compact configuration wherein in all four legs are parallel.

50. The hunting blind of claim 41 wherein each of the legs have a length that ranges from about three feet (7.62 cm) to about four feet (10.15 cm).

51. The hunting blind of claim 50 wherein the legs of the frame are adjustable and further comprise a lock for engaging the legs in a stable position.

52. The hunting blind of claim 41 wherein the unit of material is a continuous piece of material and further comprises a fastener for securely swathing the cover on the frame.

53. The hunting blind of claim 52 wherein the unit of material comprising the cover further comprises a placket to conceal the fastener.

54. The hunting blind of claim 52 wherein the fastener is a zipper and wherein the cover is installed on the frame so that the zipper is positioned at one of the two opposing ends.

55. The hunting blind of claim 54 wherein the frame forms a bottom when in the open position and wherein the zipper opens from the bottom of the frame when the frame is in the open position.

56. The hunting blind of claim 41 wherein the frame is portable in the closed positioned.

57. The hunting blind of claim 41 further characterized in that the hunting blind is portable while assembled for in-use configuration.

58. A method of hunting waterfowl, the method comprising the steps of:

providing a cover with gussets and a frame with legs;

swathing the frame with the cover and aligning the gussets with the legs to provide a taut surface;

providing on the cover a plurality of receptacles for receiving camouflage, the plurality of receptacles configured in a plurality of horizontal rows, wherein the placement of each of the plurality of receptacles in each of the plurality of horizontal rows is staggered with respect to the placement of the plurality of receptacles in the immediately adjacent rows, wherein the plurality of receptacles comprises a plurality of strakes secured horizontally to the cover, each strake having a length and a width and being secured to the cover at intervals along the length of the strake creating secure points, and wherein the intervals at which each strake is secured to the cover are staggered with respect to the secure points at which each strake is secured to the cover in the immediately adjacent row or rows.

59. The method of claim 58 further comprising the step of installing camouflage in the plurality of strakes between the secure points.

60. The method of claim 59 wherein the step of installing camouflage comprises providing camouflage in the strakes between the secure points on the cover in horizontal rows.

61. The method of claim 58 wherein the step of providing a cover with gussets and a frame with legs comprises providing a collapsible frame with legs.

62. The method of claim 61 further comprising the step of adjusting the height of the frame.

63. The method of claim 58 wherein the cover is swathed to the frame with a zipper.

64. The method of claim 63 further comprising the step of moving the frame while the frame is in an open in-use configuration.

65. The method of claim 58 further comprising the steps of providing at least one locking mechanism on at least one of the legs of the frame, removing the cover and collapsing the frame by releasing the at least one locking mechanism.

* * * * *